United States Patent
Maeng et al.

(10) Patent No.: US 11,458,623 B2
(45) Date of Patent: Oct. 4, 2022

(54) CONTROL SYSTEM TO CONTROL INTELLIGENT ROBOT DEVICE

(71) Applicant: LG ELECTRONICS INC., Seoul (KR)

(72) Inventors: Jichan Maeng, Seoul (KR); Beomoh Kim, Seoul (KR); Taehyun Kim, Seoul (KR); Jonghoon Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 344 days.

(21) Appl. No.: 16/703,683

(22) Filed: Dec. 4, 2019

(65) Prior Publication Data

US 2020/0101600 A1    Apr. 2, 2020

(51) Int. Cl.
*B25J 9/16* (2006.01)
*G05B 13/02* (2006.01)
*G06V 40/16* (2022.01)

(52) U.S. Cl.
CPC ........... *B25J 9/163* (2013.01); *B25J 9/1694* (2013.01); *G05B 13/0265* (2013.01); *G06V 40/172* (2022.01)

(58) Field of Classification Search
CPC ........ B25J 9/163; B25J 9/1694; B25J 9/1664; B25J 11/0005; B25J 11/008; G05B 13/0265; G06K 9/00288; G06K 9/00664; G06K 9/6273; G06K 9/00771; G06K 9/00221; G06K 9/00778; G05D 1/0297; G05D 1/0274; G06N 3/08; G06Q 50/10; G06Q 50/30; G06V 40/168; G06V 40/172; G06V 10/82; G06V 20/10; G06V 20/52; G06V 20/53; G06V 40/16; G06T 2207/30232; B60W 60/00253; B60W 2300/10; G08G 1/202

See application file for complete search history.

(56) References Cited

U.S. PATENT DOCUMENTS

| | | | | |
|---|---|---|---|---|
| 2017/0285635 A1* | 10/2017 | Sisbot | ............ | G01C 21/3407 |
| 2018/0249874 A1* | 9/2018 | Kuhara | ............ | G05D 1/0231 |
| 2020/0178748 A1* | 6/2020 | Han | ............ | A47L 11/4011 |
| 2020/0334470 A1* | 10/2020 | Abeykoon | ......... | G06K 9/00771 |
| 2021/0334604 A1* | 10/2021 | Yu | ............ | G06K 9/46 |

* cited by examiner

*Primary Examiner* — Abby Y Lin
*Assistant Examiner* — Esvinder Singh
(74) *Attorney, Agent, or Firm* — Lee, Hong, Degerman, Kang & Waimey PC

(57) ABSTRACT

Disclosed is a control system to control a robot. The control system to control the robot according to an aspect of the present disclosure includes a transceiver and a processor. The transceiver receives information of a user within each unit zone, wherein a plurality of robots is disposed in a zone. The processor is configured to determine a density for each respective unit zone from among the plurality of zones, determine an average density for each respective group zone from among the plurality of group zones based on the determined density, determine a priority for each group zone based on the respective determined average density, and control movements of one or more robots based on the determined priority, wherein the controlling of the movements is performed by extracting a feature from the user based on machine learning and setting the priority based on the extracted feature of the user.

15 Claims, 17 Drawing Sheets

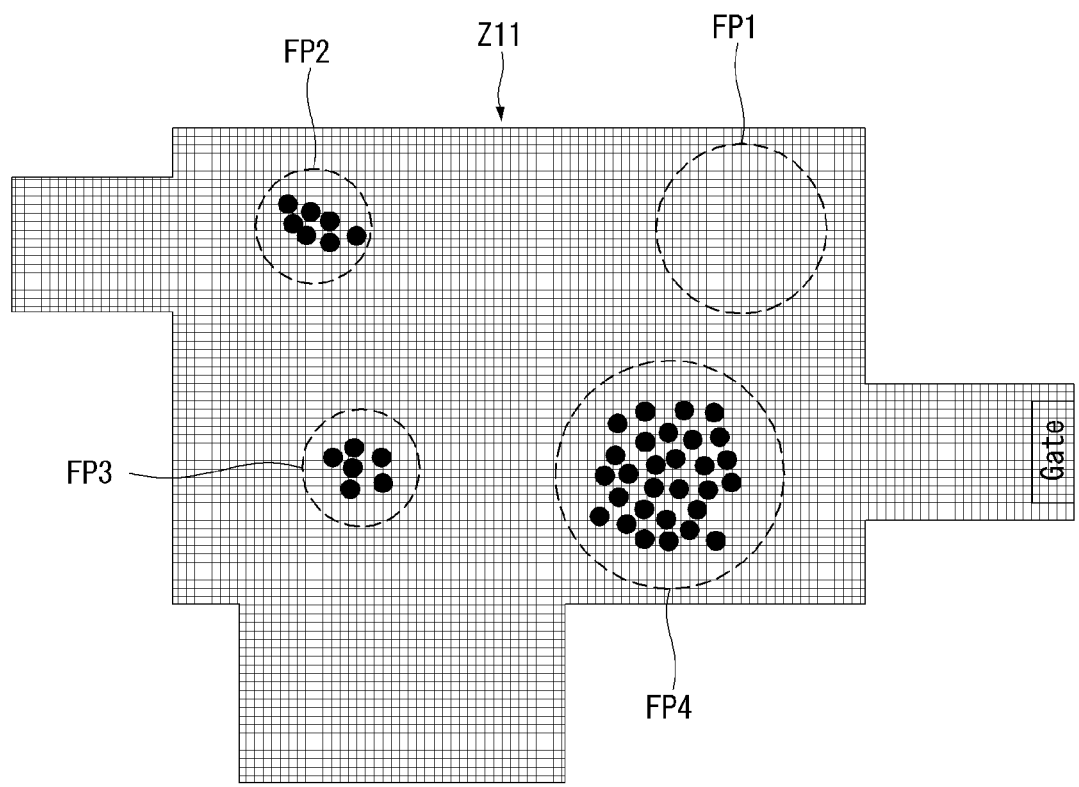

CONTROL SYSTEM TO CONTROL INTELLIGENT ROBOT DEVICE

CROSS-REFERENCE TO RELATED APPLICATIONS

Pursuant to 35 U.S.C. § 119(a), this application claims the benefit of earlier filing date and the right of priority to Korean Patent Application No. 10-2019-0094580, filed on Aug. 2, 2019, the contents of which are all hereby incorporated by reference herein in its entirety.

BACKGROUND OF THE INVENTION

Field of the Invention

The present disclosure relates to a control system to control an intelligent robot device, and more particularly, to a control system to control an intelligent robot device, capable of providing the best service to airport users by controlling a movement route of the intelligent robot device, where the controlling of the movement route is performed by disposing a plurality of intelligent robot devices in a plurality of zones within an airport, respectively, setting priority by extracting a density of airport users moving within the plurality of zones and features of the airport users, and providing airport service according to the set priority.

Related Art

Recently, in order to provide more efficiently various services to users in public places such as airport, introduction of robots, etc. is being discussed. The users can use various services including navigation service in the airport, boarding information guide service, and other multimedia contents provision service, and the like through robots placed at the airport.

However, since the unit cost of high-tech devices such as robots is high, the number of airport robots placed in the airport may be limited. Therefore, a method may be required to provide more efficient services using the limited number of airport robots.

In particular, in case of airport robots providing the navigation service in the airport, it may be inefficient that the respective airport robots provide the navigation service while moving to all areas of the airport.

In addition, when airport robots have the similar destinations while performing road guidance services, a specific area may be dense with a lot of airport robots, which may lead to a problem that it would be difficult to actively cope with the situation in which guidance services by more robots are needed.

SUMMARY OF THE INVENTION

An object of the present disclosure is to address the above-described and other needs and/or problems.

An object of the present disclosure is to provide a control system to control an intelligent robot device capable of controlling a movement route of the intelligent robot device to provide the best service to airport users, by disposing a plurality of intelligent robot devices in a plurality of zones within an airport, respectively, setting priority by extracting a density of airport users moving within the plurality of zones and features of the airport users, and providing airport services according to the set priority.

Furthermore, another object of the present disclosure is to improve reliability of a control system to control an intelligent robot device by controlling the intelligent robot device through artificial intelligent (AI) processing.

According to an aspect of the present disclosure, there is provided a control system to control an intelligent robot device. The control system includes a transceiver configured to receive information of a user within each unit zone, wherein a plurality of robots is disposed in a zone, wherein the zone is divided into a plurality of group zones, and wherein each group zone is divided into a plurality of unit zones; and a processor that is configured to determine a density for each respective unit zone from among the plurality of unit zones based on the received information of the user for the respective unit zone, determine an average density for each respective group zone from among the plurality of group zones based on the determined density for each respective unit zone that is included in the respective group zone, and determine a priority for each group zone from among the plurality of group zones based on the respective determined average density. The processor is further configured to control movements of one or more robots from among the plurality of robots based on the determined priority, wherein the controlling of the movements is performed by extracting a feature from the user based on machine learning and setting the priority based on the extracted feature of the user.

The feature of the airport user may include at least one of a sex of the user, an age of the user, a number of times the user visited the zone, a uniform-wearing status of the user, or a service history of a robot for the user.

A different weight may be assigned to each respective feature of the user according to the sex, the age, the number of uses of the airport, the uniform-wearing status, and the service history of the intelligent robot device for of the airport user.

Each of the plurality of group zones may include a part of the plurality of unit zones, and the processor may be configured to transmit a command to move the one or more intelligent robot devices to a group zone associated with a highest priority compared with priorities associated with other group zones from among the plurality of group zones.

The processor may be configured to assign a weight to each respective feature of the user and assign a higher priority to the group zone according to weights of the feature of the user.

The processor may be configured to assign a higher priority to the group zone with a greater average density from the determined average densities.

The plurality of group zones may include a first group zone and a second group zone, and the priority may be determined by comparing the weight for the feature of the user of the first group zone with the weight for the feature of the user of the second group zone when a first average density of the first group zone has a same value as a second average density of the second group zone.

The plurality of group zones may include a first group zone and a second group zone, and the priority may be determined by comparing a first average of average densities of sub group zones constituting the first group zone with a second average of average densities of sub group zones constituting the second group zone when a first average density of the first group zone has a same value as a second average density of the second group zone.

The priority may be determined by comparing a weight for the feature of the user of the first group zone with the weight for the feature of the user of the second group zone when the first average of average densities of sub group zones constituting the first group zone have a same value as the second average of average densities of sub group zones constituting the second group zone.

The processor may be configured to: set a movement route along which the one or more robots move according to the determined priority; and transmit a command to move the one or more robots according to the set movement route.

The processor may be configured to transmit a command to move the one or more robots from a first group zone associated with a high priority to a second group zone associated with a low priority.

The information of the airport user may include image data for each unit zone and audio data collected from each unit zone, and the processor may be configured to obtain the number of airport users existing in each unit zone as a density of each unit zone by using the image data or the audio data.

The control system may further include a memory configured to store an image recognition model for recognizing a face of the user by using the image data. The image recognition model may correspond to an artificial neural network-based model trained and learned by using a deep running algorithm or machine learning algorithm, and the processor may be configured to recognize faces of users by using the image data and the image recognition model and determine a number of recognized faces as the number of users.

The control system may further include a memory configured to store location information indicating a location of each of the plurality of group zones. The processor may be configured to control movements of the one or more intelligent robot devices by using the priority and the location information.

According to another aspect of the present disclosure, there is provided an operation method of a control system controlling a plurality of intelligent robot devices. The operation method includes: receiving information of a user within each unit zone, wherein a plurality of robots is disposed in a zone, wherein the zone is divided into a plurality of group zones, and wherein each group zone is divided into a plurality of unit zones; determining a density for each respective unit zone from among the plurality of unit zones, respectively based on the received information of the user for the respective unit zone; determining an average density for each respective group zone from among the plurality of group zones based on the determined density for each respective unit zone that is included in the respective group zone; determining a priority for each group zone from among the plurality of group zones based on the respective determined average density; and controlling movements of one or more robots from among the plurality of robots, based on the determined priority, wherein the controlling of the movements is performed by extracting a feature of the user based on machine learning and setting the priority based on the extracted feature of the user.

The extracting of the feature of the airport user may include performing extraction by using at least one of a sex of the user, an age of the user, a number of times the user visited the zone, a uniform-wearing status of the user, and a service history of the robot for the user.

The extracting of the feature of the airport user may include assigning a different weight according to the sex, the age, the number of uses of the airport, the uniform-wearing status, and the service history of the intelligent robot device.

Each of the plurality of group zones may include a part of the plurality of unit zones, and the controlling may include transmitting a command to move the one or more robots to a group zone associated with a highest priority compared with priorities associated with other group zones from among the plurality of group zones.

The operation method may further include assigning a higher priority to the group zone with a higher weight for the feature of the user.

The operation method may further include assigning a higher priority to the group zone with a greater average density from the determined average densities.

The plurality of group zones may include a first group zone and a second group zone, and the priority may be determined by comparing the weight for the feature of the user of the first group zone with the weight for the feature of the user of the second group zone when a first average density of the first group zone has a same value as a second average density of the second group zone.

The plurality of group zones may include a first group zone and a second group zone, and the determining of the priority may include determining the priority by comparing a first average of average densities of sub group zones constituting the first group zone with a second average of average densities of sub group zones constituting the second group zone when a first average density of the first group zone has a same value as a second average density of the second group zone.

The priority may be determined by comparing a weight for the feature of the user of the first group zone with the weight for the feature of the user of the second group zone when the first average of average densities of sub group zones constituting the first group zone has a same value as the second average of average densities of sub group zones constituting the second group zone.

The operation method may further include setting a movement route along which the one or more robots move according to the determined priority; and transmitting a command to move the one or more robots according to the set movement route The transmitting the command further includes transmitting the command to move the one or more robots from a first group zone associated with a high priority to a second group zone associated with a low priority.

BRIEF DESCRIPTION OF THE DRAWINGS

The accompanying drawings, which are included to provide a further understanding of the disclosure, illustrate embodiments of the disclosure and together with the description serve to explain the principle of the disclosure.

FIGS. 16 and 17 illustrate densities of airport users in accordance with an embodiment of the present disclosure.

FIG. 18 illustrates a density measured in each unit zone in accordance with the embodiment of the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through sections A through G below.

A. Example of Block Diagram of UE and 5G Network

Figure 1:
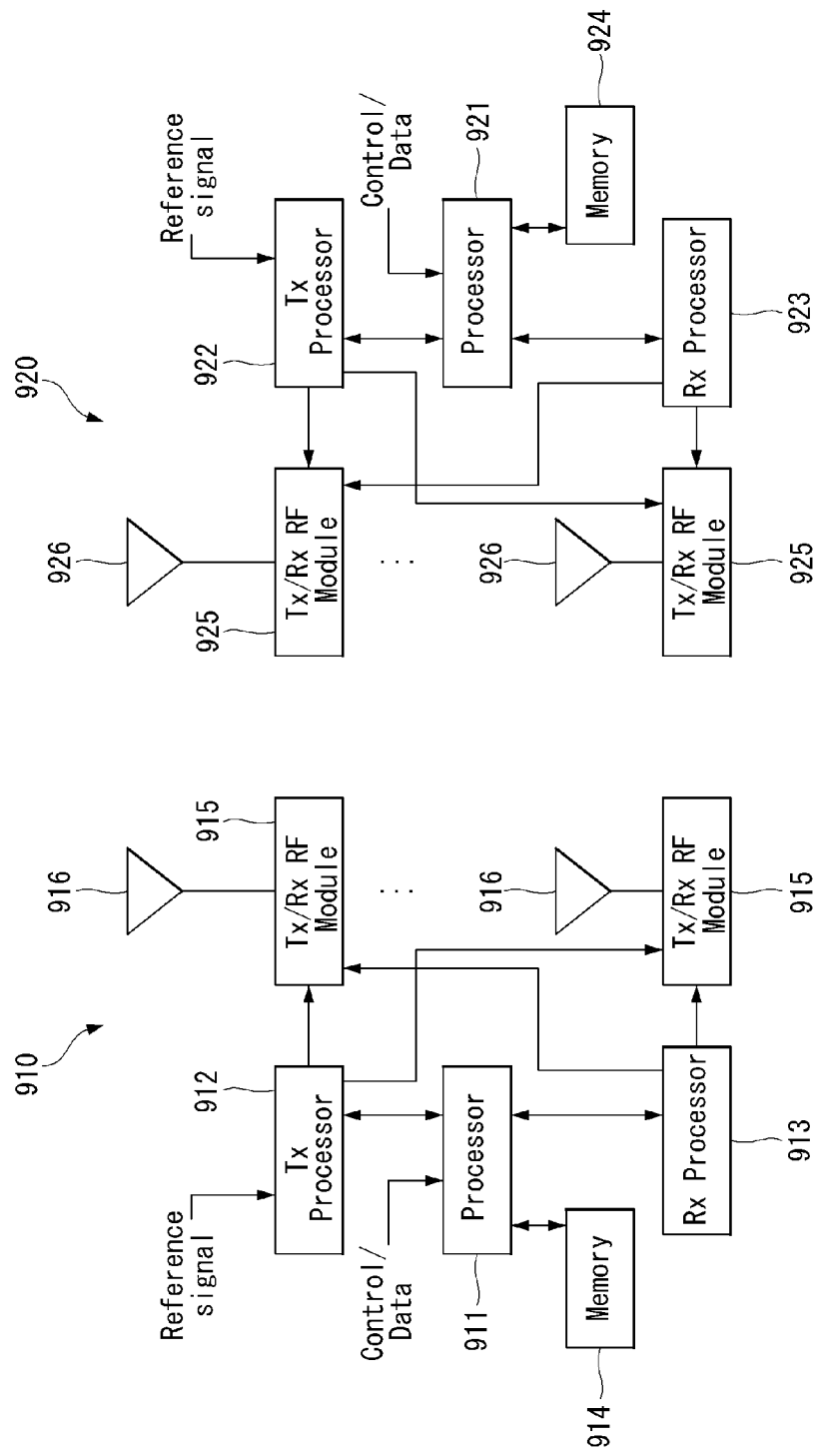
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a robot is defined as a first communication device 910, and a processor 911 can perform detailed operations of the robot.

A 5G network communicating with the robot is defined as a second communication device 920, and a processor 921 can perform detailed autonomous operations. Here, the 5G network may include another robot communicating with the robot.

The 5G network may be represented as the first communication device, and the robot may be represented as the second communication device.

For example, the first communication device or the second communication device may be a base station, a network node, a transmission terminal, a reception terminal, a wireless device, a wireless communication device, a robot, or the like.

For example, a terminal or user equipment (UE) may include a robot, a drone, a unmanned aerial vehicle (UAV), a cellular phone, a smart phone, a laptop computer, a digital broadcast terminal, a personal digital assistant (PDA), a portable multimedia player (PMP), a navigation device, a slate PC, a tablet PC, an ultrabook, a wearable device (e.g., a smart watch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 916. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
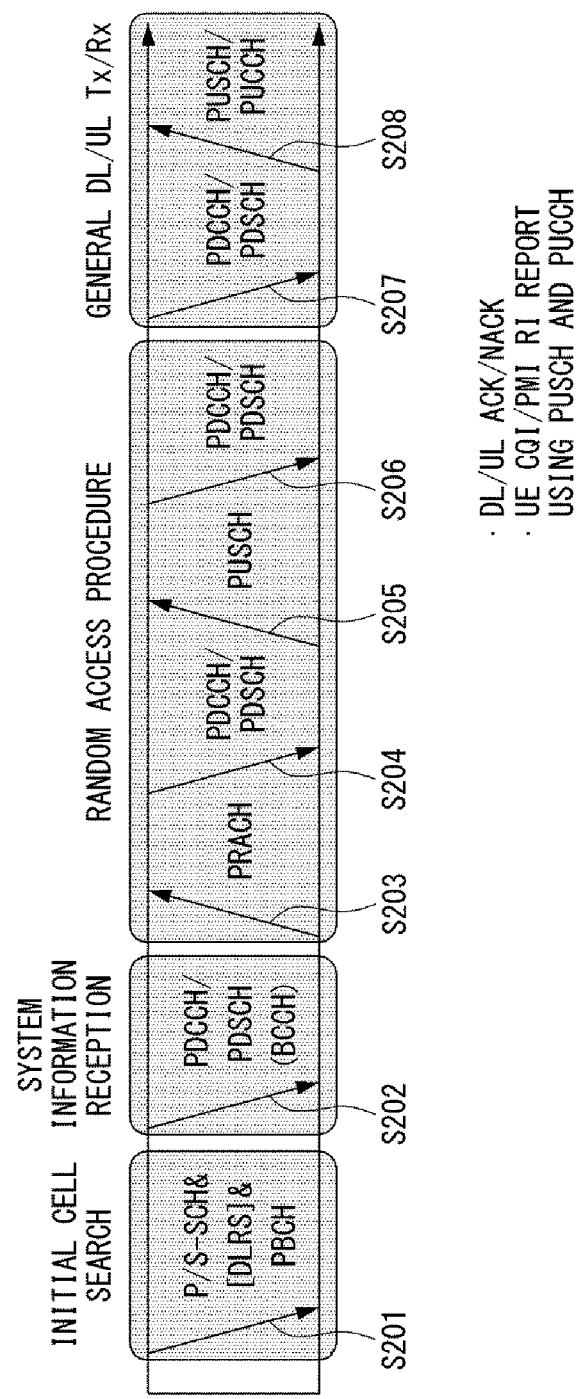
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a base station (BS) (S201). For this operation, the UE can receive a primary synchronization channel (P-SCH) and a secondary synchronization channel (S-SCH) from the BS to synchronize with the BS and acquire information such as a cell ID. In long-term-evolution (LTE) and new radio (NR) systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of a single sideband (SSB). The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of 5 ms, 10 ms, 20 ms, 40 ms, or 80 ms, 160 ms by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent path loss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Robots Using 5G Communication

Figure 3:
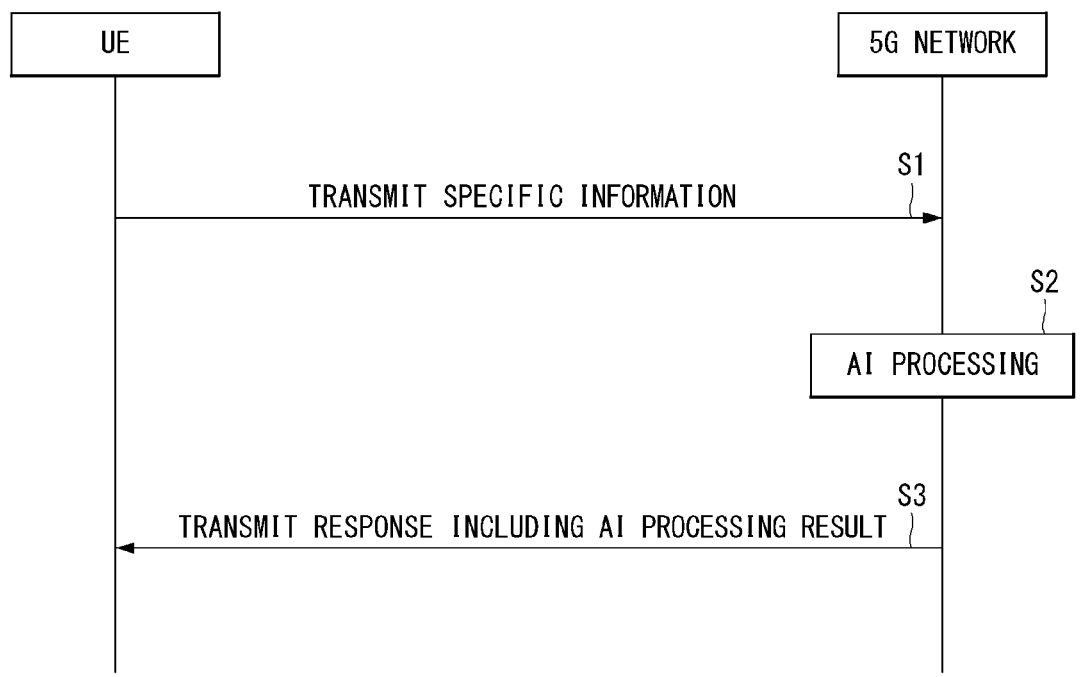
FIG. 3 shows an example of basic operations of a user equipment and a 5G network in a 5G communication system.

FIG. 3 shows an example of basic operations of a robot and a 5G network in a 5G communication system.

The robot transmits specific information to the 5G network (S1). The specific information may include autonomous driving related information. In addition, the 5G network can determine whether to remotely control the robot (S2). Here, the 5G network may include a server or a module which performs remote control related to autonomous driving. In addition, the 5G network can transmit information (or signal) related to remote control to the robot (S3).

G. Applied Operations Between Autonomous Robot and 5G Network in 5G Communication System Hereinafter, the operation of a robot using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the robot performs an initial access procedure and a random access procedure with the 5G network prior to step S1 of FIG. 3 in order to transmit/receive signals, information and the like to/from the 5G network.

More specifically, the robot performs an initial access procedure with the 5G network based on an SSB in order to acquire DL synchronization and system information. A beam management (BM) procedure and a beam failure recovery procedure may be added in the initial access procedure, and quasi-co-location (QCL) relation may be added in a process in which the robot receives a signal from the 5G network.

In addition, the robot performs a random access procedure with the 5G network for UL synchronization acquisition and/or UL transmission. The 5G network can transmit, to the robot, a UL grant for scheduling transmission of specific information. Accordingly, the robot transmits the specific information to the 5G network on the basis of the UL grant. In addition, the 5G network transmits, to the robot, a DL grant for scheduling transmission of 5G processing results with respect to the specific information. Accordingly, the 5G network can transmit, to the robot, information (or a signal) related to remote control on the basis of the DL grant.

Next, a basic procedure of an applied operation to which a method proposed by the present disclosure which will be described later and URLLC of 5G communication are applied will be described.

As described above, a robot can receive DownlinkPreemption IE from the 5G network after the robot performs an initial access procedure and/or a random access procedure with the 5G network. Then, the robot receives DCI format 2_1 including a preemption indication from the 5G network on the basis of DownlinkPreemption IE. The robot does not perform (or expect or assume) reception of eMBB data in resources (PRBs and/or OFDM symbols) indicated by the preemption indication. Thereafter, when the robot needs to transmit specific information, the robot can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the robot receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the robot transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

H. Autonomous Driving Operation Between Robots Using 5G Communication

Figure 4:
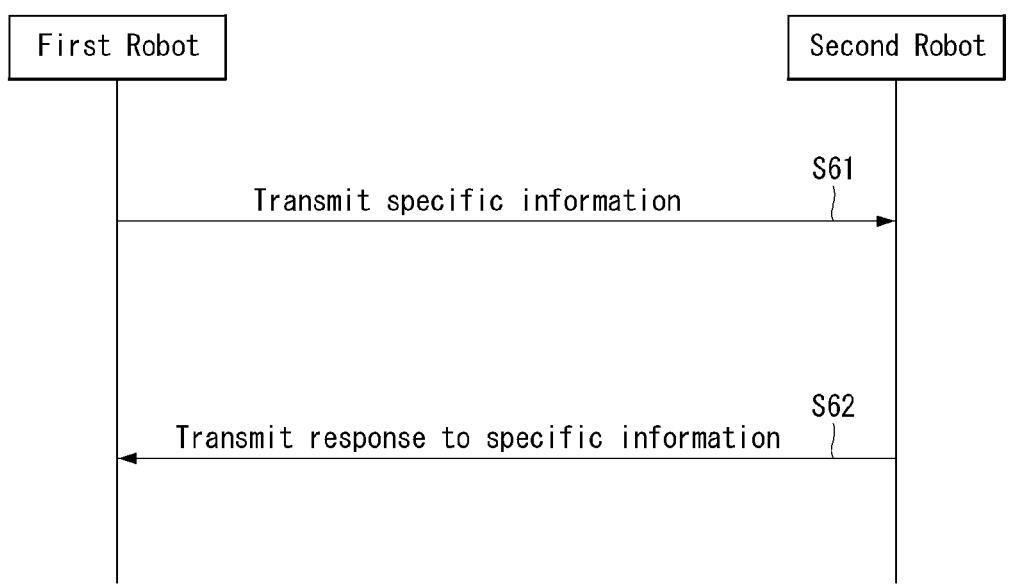
FIG. 4 illustrates an example of a basic operation between robots using 5G communication.

FIG. 4 shows an example of a basic operation between robots using 5G communication.

A first robot transmits specific information to a second robot (S61). The second robot transmits a response to the specific information to the first robot (S62).

Meanwhile, a configuration of an applied operation between robots may depend on whether the 5G network is directly (sidelink communication transmission mode 3) or indirectly (sidelink communication transmission mode 4) involved in resource allocation for the specific information and the response to the specific information.

Next, an applied operation between robots using 5G communication will be described.

First, a method in which a 5G network is directly involved in resource allocation for signal transmission/reception between robots will be described.

The 5G network can transmit DCI format 5A to the first robot for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first robot transmits SCI format 1 for scheduling of specific information transmission to the second robot over a PSCCH. Then, the first robot transmits the specific information to the second robot over a PSSCH.

Next, a method in which a 5G network is indirectly involved in resource allocation for signal transmission/reception will be described.

The first robot senses resources for mode-4 transmission in a first window. Then, the first robot selects resources for mode-4 transmission in a second window on the basis of the sensing result. Here, the first window refers to a sensing window and the second window refers to a selection window. The first robot transmits SCI format 1 for scheduling of transmission of specific information to the second robot over a PSCCH on the basis of the selected resources. Then, the first robot transmits the specific information to the second robot over a PSSCH.

The above-described 5G communication technology can be combined with methods proposed in the present disclosure which will be described later and applied or can complement the methods proposed in the present disclosure to make technical features of the methods concrete and clear.

Figure 5:
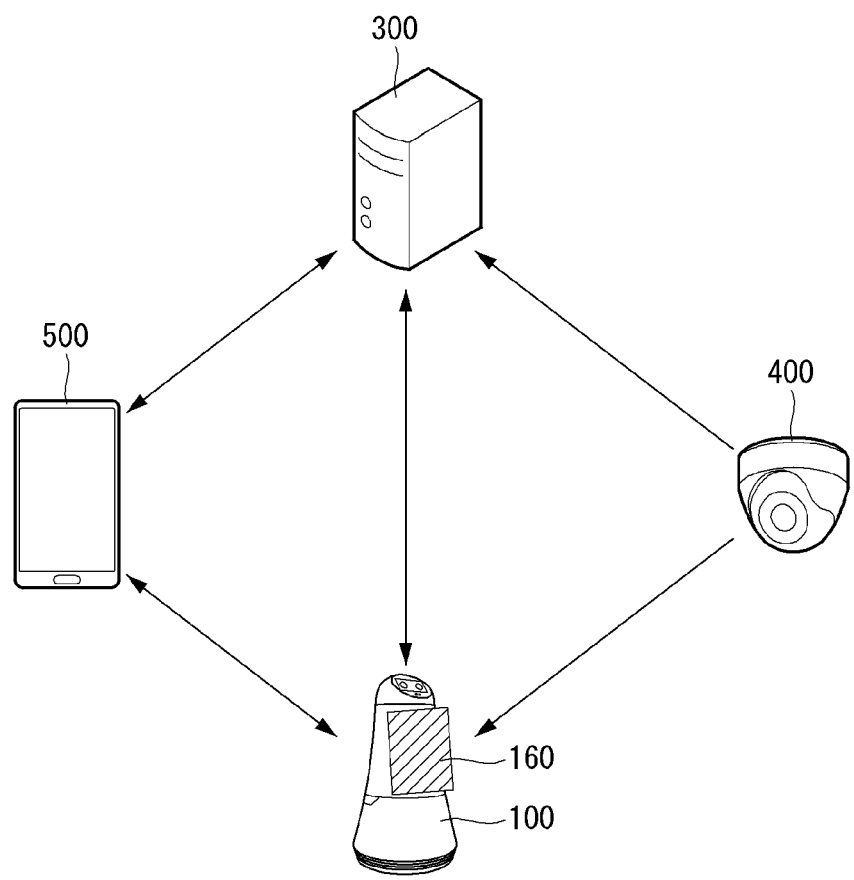
FIG. 5 illustrates a control system controlling an intelligent robot device according to an embodiment of the present disclosure.

FIG. 5 illustrates a control system controlling an intelligent robot device according to an embodiment of the present disclosure.

Referring to FIG. 5, a control system controlling an intelligent robot device according to an embodiment of the present disclosure may include an intelligent robot device 100, a server 300, a camera 400, and a mobile terminal 500.

The intelligent robot device 100 may serve as patrol, guide, cleaning, disinfect, transport, and the like in the airport. For example, the intelligent robot device 100 may travel around or indoors the general exhibition hall, museum, exhibition, airport, etc., and may provide various information to customers or airport users.

The intelligent robot device 100 may transmit and receive signals to and from the server 300 or the mobile terminal 500. For example, the intelligent robot device 100 may transmit and receive a signal including information on a situation in the airport to and from the server 300.

The intelligent robot device 100 may receive, from the camera 400 of the airport, image information of respective zones of the airport taken with the camera 400. Thus, the intelligent robot device 100 may monitor the situation of the airport by combining image information taken by the intelligent robot device 100 and image information received from the camera 400.

The intelligent robot device 100 may receive a command directly from the airport user. For example, the intelligent robot device 100 may receive a command directly from the airport user through an input of touching a display 160 included in the intelligent robot device 100 or a voice input, etc.

The intelligent robot device 100 may perform an operation such as patrol, guide, and cleaning according to commands received from the airport user, the server 300, or the mobile terminal 500, etc.

The server 300 may receive information from the intelligent robot device 100, the camera 400, and/or the mobile terminal 500. The server 300 may combine, store, and manage information received from the respective components. The server 300 may transmit the stored information to the intelligent robot device 100 or the mobile terminal 500. The server 300 may send a command signal for each of a plurality of intelligent robot devices 100 disposed in the airport.

The server 300 may transmit, to the intelligent robot device 100, airport-related data such as airport maps and mapping data including information about objects disposed in the airport or person moving in the airport.

The camera 400 may include cameras installed in the airport. For example, the camera 400 may include all of a plurality of closed circuit television (CCTV) cameras installed in the airport, an infrared thermal sensor camera, and the like. The camera 400 may sends images taken with the camera 400 to the server 300 or the intelligent robot device 100. The image taken with the camera 400 may be referred to as an airport image.

The mobile terminal 500 may transmit and receive data to and from the server 300 or the intelligent robot device 100 in the airport. For example, the mobile terminal 500 may receive airport-related data, such as flight time schedule, airport map, etc., from the intelligent robot device 100 or the server 300. The airport user may receive and obtain information required in the airport from the intelligent robot device 100 or the server 300 through the mobile terminal 500. The mobile terminal 500 may transmit data, such as photographs, video, message, etc., to the intelligent robot device 100 or the server 300. For example, the airport user may send a picture of a missing child to the intelligent robot device 100 or the server 300 to report the missing child, or may request the cleaning of the corresponding zone by taking a picture of the zone requiring the cleaning in the airport and transmitting the picture to the server 300.

The mobile terminal 500 may transmit, to the intelligent robot device 100, a signal for calling the intelligent robot device 100, a signal for instructing to perform a specific operation, an information request signal, or the like. The intelligent robot device 100 may move to a location of the mobile terminal 500 in response to a call signal received from the mobile terminal 500 or perform an operation corresponding to a command signal.

Alternatively, the intelligent robot device 100 may transmit data corresponding to the information request signal to the mobile terminal 500 of each airport user.

Figure 6:
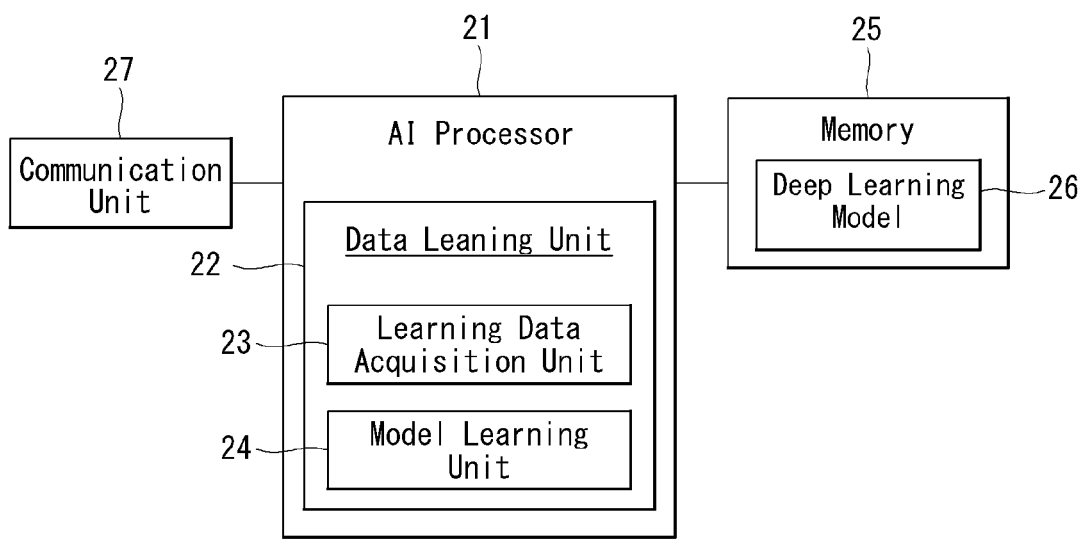
FIG. 6 is a block diagram of an AI device according to an embodiment of the present disclosure.

FIG. 6 is a block diagram of an AI device according to an embodiment of the present disclosure.

An AI device 20 may include an electronic device including an AI module capable of performing AI processing, or a server including the AI module, or the like. Further, the AI device 20 may be included as at least some components of the intelligent robot device 100 illustrated in FIG. 5 and perform together at least a part of the AI processing.

The AI processing may include all operations related to driving of the intelligent robot device 100 illustrated in FIG. 5. For example, the intelligent robot device 100 can perform AI processing on image signals or sensing data to perform processing/decision operation and a control signal generation operation. For example, the intelligent robot device 100 can perform AI processing on data acquired through interaction with other electronic devices (e.g., the server 300 (see FIG. 5), the mobile terminal 500 (see FIG. 5), the second intelligent robot device (see FIG. 4)) included in the airport to perform the control of driving.

The AI device 20 may include an AI processor 21, a memory 25, and/or a communication unit 27.

The AI device 20 is a computing device capable of learning a neutral network and may be implemented as various electronic devices including a server, a desktop PC, a notebook PC, a tablet PC, and the like.

The AI processor 21 may learn a neural network using a program stored in the memory 25. In particular, the AI processor 21 may learn a neural network for recognizing robot related data. Here, the neural network for recognizing the robot related data may be designed to emulate a human brain structure on a computer and may include a plurality of network nodes with weight that emulate neurons in a human neural network. The plurality of network nodes may send and receive data according to each connection relationship so that neurons emulate the synaptic activity of neurons sending and receiving signals through synapses. Here, the neural network may include a deep learning model, which has evolved from a neural network model. In the deep learning model, the plurality of network nodes may be arranged in different layers and may send and receive data according to a convolution connection relationship. Examples of the neural network model may include various deep learning techniques, such as deep neural networks (DNN), convolutional deep neural networks (CNN), recurrent Boltzmann machine (RNN), restricted Boltzmann machine (RBM), deep belief networks (DBN), and deep Q-networks, and are applicable to fields including computer vision, voice recognition, natural language processing, and voice/signal processing, etc.

A processor performing the above-described functions may be a general purpose processor (e.g., CPU), but may be AI-dedicated processor (e.g., GPU) for AI learning.

The memory 25 may store various programs and data required for the operation of the AI device 20. The memory 25 may be implemented as a non-volatile memory, a volatile memory, a flash memory, a hard disk drive (HDD), or a solid state drive (SSD), etc. The memory 25 may be accessed by the AI processor 21, and the AI processor 21 may read/write/modify/delete/update data. Further, the memory 25 may store a neural network model (e.g., deep learning model 26) created by a learning algorithm for data classification/recognition according to an embodiment of the present disclosure.

The AI processor 21 may further include a data learning unit 22 for learning a neural network for data classification/recognition. The data learning unit 22 may learn criteria as to which learning data is used to decide the data classification/recognition and how data is classified and recognized using learning data. The data learning unit 22 may learn a deep learning model by acquiring learning data to be used in learning and applying the acquired learning data to the deep learning model.

The data learning unit 22 may be manufactured in the form of at least one hardware chip and mounted on the AI device 20. For example, the data learning unit 22 may be manufactured in the form of a dedicated hardware chip for artificial intelligence (AI), or may be manufactured as a part of a general purpose processor (e.g., CPU) or a graphic-dedicated processor (e.g., GPU) and mounted on the AI device 20. Further, the data learning unit 22 may be implemented as a software module. If the data learning unit 22 is implemented as the software module (or a program module including instruction), the software module may be stored in non-transitory computer readable media. In this case, at least one software module may be provided by an operating system (OS), or provided by an application.

The data learning unit 22 may include a learning data acquisition unit 23 and a model learning unit 24.

The learning data acquisition unit 23 may acquire learning data required for a neural network model for classifying and recognizing data. For example, the learning data acquisition unit 23 may acquire, as learning data, vehicle data and/or sample data to be input to a neural network model.

By using the acquired learning data, the model learning unit 24 may learn so that the neural network model has a criteria for determining how to classify predetermined data. In this instance, the model learning unit 24 may train the neural network model through supervised learning which uses at least a part of the learning data as the criteria for determination. Alternatively, the model learning unit 24 may train the neural network model through unsupervised learning which finds criteria for determination by allowing the neural network model to learn on its own using the learning data without supervision. Further, the model learning unit 24 may train the neural network model through reinforcement learning using feedback about whether a right decision is made on a situation by learning. Further, the model learning unit 24 may train the neural network model using a learning algorithm including error back-propagation or gradient descent.

If the neural network model is trained, the model learning unit 24 may store the trained neural network model in the memory. The model learning unit 24 may store the trained neural network model in a memory of a server connected to the AI device 20 over a wired or wireless network.

The data learning unit 22 may further include a learning data pre-processing unit (not shown) and a learning data selection unit (not shown), in order to improve a result of analysis of a recognition model or save resources or time required to create the recognition model.

The learning data pre-processing unit may pre-process obtained data so that the obtained data can be used in learning for deciding the situation. For example, the learning data pre-processing unit may process obtained learning data into a predetermined format so that the model learning unit 24 can use the obtained learning data in learning for recognizing images.

Moreover, the learning data selection unit may select data required for learning among learning data obtained by the learning data acquisition unit 23 or learning data pre-processed by the pre-processing unit. The selected learning data may be provided to the model learning unit 24. For example, the learning data selection unit may detect a specific area in an image obtained with a camera of a robot to select only data for objects included in the specific area as learning data.

In addition, the data learning unit 22 may further include a model evaluation unit (not shown) for improving the result of analysis of the neural network model.

The model evaluation unit may input evaluation data to the neural network model and may allow the data learning unit 22 to learn the neural network model again if a result of analysis output from the evaluation data does not satisfy a predetermined criterion. In this case, the evaluation data may be data that is pre-defined for evaluating the recognition model. For example, if the number or a proportion of evaluation data with inaccurate analysis result among analysis results of the recognition model learned on the evaluation data exceeds a predetermined threshold, the model evaluation unit may evaluate the analysis result as not satisfying the predetermined criterion.

The communication unit 27 may transmit, to an external electronic device, a result of the AI processing by the AI processor 21.

Here, the external electronic device may be defined as an intelligent robot device. Further, the AI device 20 may be defined as another intelligent robot device or a 5G network that communicates with the intelligent robot device. The AI device 20 may be implemented by being functionally embedded into various modules included in the intelligent robot device. The 5G network may include a server or a module that performs the control related to the robot.

Although the AI device 20 illustrated in FIG. 6 was functionally separately described into the AI processor 21, the memory 25, the communication unit 27, etc., the above components may be integrated into one module and referred to as an AI module.

Figure 7:
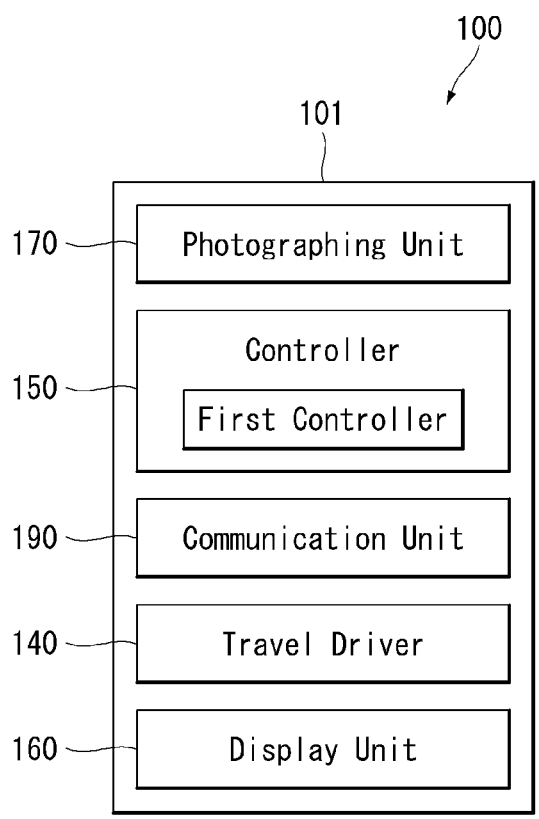
FIG. 7 is a block diagram schematically illustrating configuration of an intelligent robot device according to an embodiment of the present disclosure.

FIG. 7 is a block diagram schematically illustrating configuration of an intelligent robot device according to an embodiment of the present disclosure.

Referring to FIG. 7, an intelligent robot device 100 according to an embodiment of the present disclosure may include a body 101, a communication unit 190, a photographing unit 170, a controller 150, a display unit 160, and a travel driver 140.

The body 101 may be formed in a predetermined shape. The body 101 may have any shape as long as it can protect the components disposed therein from foreign substances or obstacles generated from the outside.

The communication unit 190 may be embedded in the body 101 and may receive mapping data for obstacles located in the airport through images taken with a plurality of cameras disposed in the airport. The communication unit 190 may include a 5G router 162 (see FIG. 8). The communication unit 190 may receive mapping data using 5G communication or 5G network. The obstacle may include the airport user or the customer moving in the airport, or an object placed at the airport, or the like.

An image taken with the plurality of cameras disposed in the airport may be referred to as an airport image.

The photographing unit 170 may be disposed at the body 101 and may take an image of the obstacle. The photographing unit 170 may include at least one camera. The at least one camera may be referred to as a robot camera. The robot camera may take in real time an image of surroundings of the intelligent robot device 100 that is travelling or moving. An image taken with the robot camera may be referred to as a patrol image, a moving image, a robot image.

The processor may calculate a plurality of densities corresponding to a plurality of unit zones, respectively, based on information of airport users for each unit zone, calculate average densities for a plurality of group zones by using the calculated plurality of densities, and determine a priority for each of the plurality of group zones based on the calculated average densities. The processor 110 may be referred to as a controller or a micom 110 (see FIG. 8).

The processor 110 may control movements of one or more intelligent robot devices of the plurality of intelligent robot devices, based on the determined priority. In the controlling of the movements of the one or more intelligent devices, a feature of the airport user may be extracted by learning the information of the airport user, and the priority may be reset by additionally reflecting the extracted feature of the airport user.

The feature of the airport user may include at least one of sex, age, the number of users of the airport, a uniform-wearing status, and a service history of the intelligent robot device 100, of the airport user. Different weights may be assigned to the features of the airport users according to the sex, the age, the number of uses of the airport, the uniform-wearing status, and the service history of the intelligent robot device 100, of the airport user.

The processor 110 may be controlled_to set a plurality of paths that can reach a target location, to which a call signal is output, while avoiding the obstacle based on the mapping data provided by the communication unit 190 and the robot image taken by the photographing unit 170.

The travel driver 140 may be disposed on the lower part of the body 101 and may move to the target location under the control of the controller 150. The travel driver 140 will be described in detail later.

The display unit 160 may be disposed in front or on a front surface of the body 101 and may display information on airport services. For example, the display unit 160 may display execution screen information of an application program driven by the intelligent robot device 100 or information on a user interface (UI) and a graphic user interface (GUI) according to the execution screen information.

The display unit 160 may include at least one of a liquid crystal display (LCD), a thin film transistor-liquid crystal display (TFT LCD), an organic light emitting diode (OLED) display, a flexible display, a 3D display, and an electronic ink (e-ink) display.

Two or more display units 160 may exist according to a shape of the intelligent robot device 100. In this case, in the intelligent robot device 100, the plurality of display units 160 may be disposed in front (or the front surface) or in rear (or the rear surface).

The display unit 160 may include a touch sensor that senses a touch on the display unit 160 in order to receive a control command by a touch method. If a touch is performed on the display unit 160 using the touch sensor, the touch sensor may sense the touch, and the controller 150 may be configured to generate a control command corresponding to the touch based on this. The contents input by the touch method may include information about the airport services, an airport service menu item, and the like.

The display unit 160 may form a touch screen with the touch sensor, and in this case, the touch screen may serve as a user interface. The display unit 160 may be referred to as a user interface.

Figure 8:
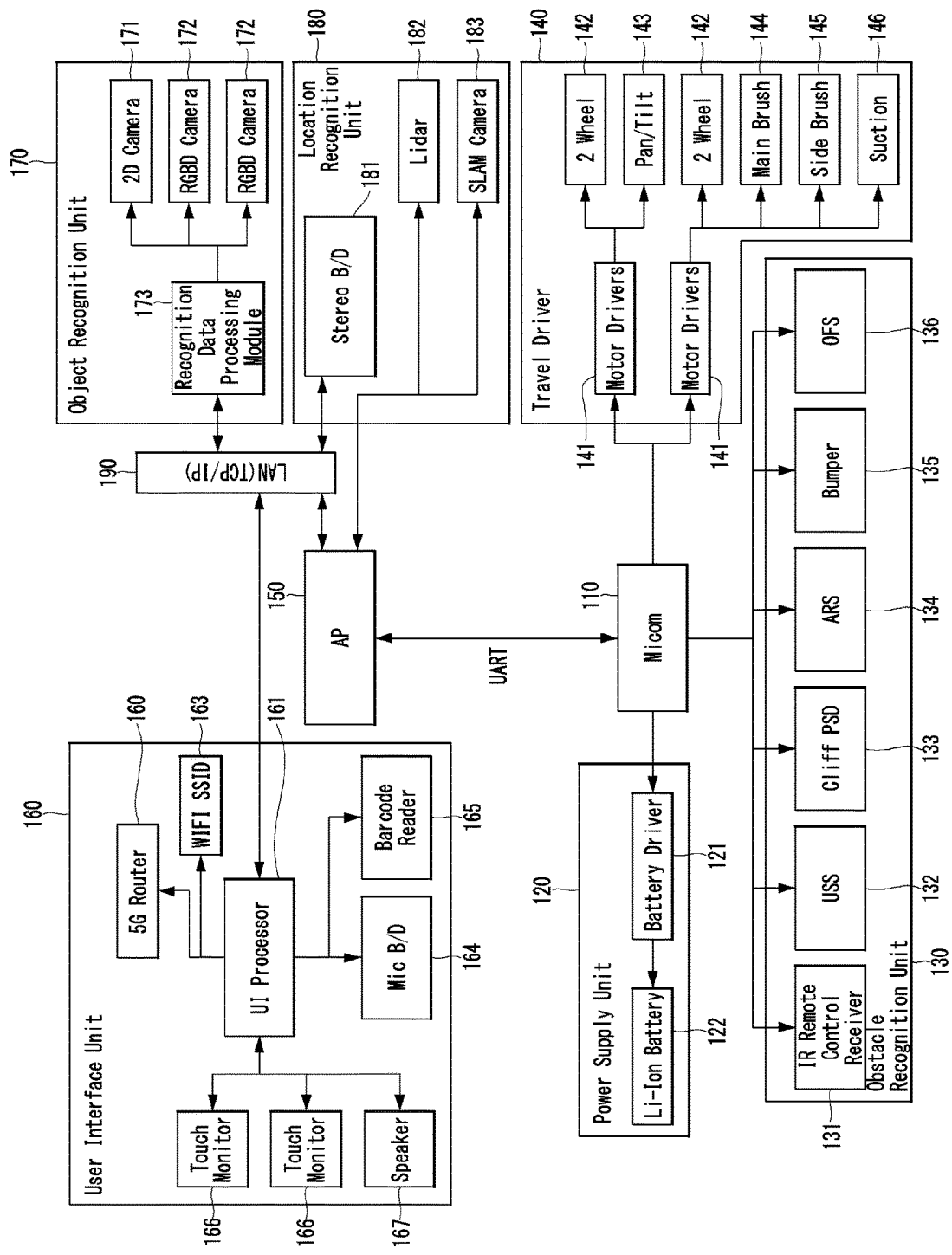
FIG. 8 is a block diagram illustrating hardware configuration of an intelligent robot device according to an embodiment of the present disclosure.

FIG. 8 is a block diagram illustrating hardware configuration of an intelligent robot device according to an embodiment of the present disclosure.

As illustrated in FIG. 8, hardware of an intelligent robot device 100 according to an embodiment of the present disclosure may include a Micom group and an application processor (AP) group. However, the present disclosure is not limited thereto. For example, the Micom group and the AP group may be formed as one controller 150 (see FIG. 7).

A Micom 110 may manage a power supply unit 120 including a battery, etc., an obstacle recognition unit 130 including various sensors, and a travel driver 140 including a plurality of motors and wheels in the hardware of the intelligent robot device 100. The Micom 110 may be referred to as a first controller 150 (see FIG. 7).

The power supply unit 120 may include a battery driver 121 and a Li-ion battery 122. The battery driver 121 may manage the charging and discharging of the Li-ion battery 122. The Li-ion battery 122 may supply electric power for the driving of the intelligent robot device 100. For example, the Li-ion battery 122 may be configured by connecting two 24V/102 A Li-ion batteries in parallel.

The obstacle recognition unit 130 may include an IR remote control receiver 131, an ultrasonic sensor (USS) 132, a cliff PSD 133, an attitude reference system (ARS) 134, a bumper 135, and an optical flow sensor (OFS) 136.

The IR remote control receiver 131 may include a sensor that receives a signal of an IR remote control for remotely controlling the intelligent robot device 100.

The USS 132 may include a sensor that decides a distance between an obstacle and the intelligent robot device 100 using an ultrasonic signal.

The cliff PSD 133 may include a sensor that senses a cliff or a bluff, etc. in a range of travel of the intelligent robot device 100 in all directions of 360 degrees.

The ARS 134 may include a sensor that can detect an attitude of the intelligent robot device 100. The ARS 134 may include a sensor consisting of 3-axis accelerometer and 3-axis gyroscope that detect an amount of rotation of the intelligent robot device 100.

The bumper 135 may include a sensor that senses a collision between the intelligent robot device 100 and the obstacle. The sensor included in the bumper 135 may sense the collision between the intelligent robot device 100 and the obstacle in a range of 360 degrees.

The OFS 136 may include a sensor that can sense a phenomenon, in which wheels of the intelligent robot device 100 spin during travel of the intelligent robot device 100, and measure a travel distance of the intelligent robot device 100 on various floor surfaces.

The travel driver 140 may include motor drivers 141, a wheel motor 142, a rotary motor 143, a main brush motor 144, a side brush motor 145, and a suction motor 146.

The motor drivers 141 may serve to drive a wheel motor, a brush motor, and a suction motor for the travelling and the cleaning of the intelligent robot device 100.

The wheel motor 142 may drive a plurality of wheels for the travelling of the intelligent robot device 100. The rotary motor 143 may be driven for left-right rotation and up-down rotation of the main body or a head (not shown) of the intelligent robot device 100, or may be driven for the wheel direction change or the rotation of the intelligent robot device 100.

The main brush motor 144 may drive a brush that sweeps up filth on the airport floor. The side brush motor 145 may drive a brush that sweeps up filth on a peripheral area of an outer surface of the intelligent robot device 100.

The suction motor 146 may be driven to suck filth on the airport floor.

The application processor (AP) 150 may serve as a central processing unit, i.e., the controller 150 (see FIG. 7) for entirely managing a hardware module system of the intelligent robot device 100. The AP may run an application program for travelling using location information received from various sensors and transmit input and output information of airport users to the Micom 110 to drive the motor, etc.

A user interface unit 160 may include a user interface (UI) processor 161, a 5G router 162, WIFI SSID 163, a microphone board 164, a barcode reader 165, a touch monitor 166, and a speaker 167. The user interface unit 160 may be referred to as a display unit.

The UI processor 161 may control an operation of the user interface unit 160 that is responsible for the input and output of the airport user.

The 5G router 162 may receive necessary information from the outside and perform 5G communication for transmitting information to the airport user.

The WIFI SSID 163 may analyze a signal strength of WiFi and perform location recognition of a specific object or the intelligent robot device 100.

The microphone board 164 may receive a plurality of microphone signals, process a voice signal into voice data which is a digital signal, and analyze a direction of the voice signal and the corresponding voice signal.

The barcode reader 165 may read barcode information stated in a plurality of tickets used in the airport.

The touch monitor 166 may include a touch panel configured to receive an input of the airport user and a monitor for displaying output information.

The speaker 167 may serve to inform the airport user of specific information by voice.

An object recognition unit or photographing unit 170 may include a camera 171, an Red, Green, Blue, Distance (RGBD) camera 172, and a recognition data processing module 173. The object recognition unit 170 may be referred to as a photographing unit.

The camera 171 may be a sensor for recognizing an obstacle based on a two-dimensional (2D) image. The obstacle may include a person or an object, or the like.

The RGBD camera 172 may be a sensor for detecting an obstacle using captured images having depth data obtained from a camera having RGBD sensors or other similar 3D imaging devices.

The recognition data processing module 173 may process signals such as 2D image/video or 3D image/video obtained from a 2D camera 171 and a RGBD camera 172 and recognize the obstacle.

A location recognition unit 180 may include a stereo board (B/D) 181, a light detection and ranging (LiDAR) 182, and a simultaneous localization and mapping (SLAM) camera 183.

The SLAM camera 183 may implement simultaneous location tracking and mapping technology.

The intelligent robot device 100 may detect surrounding information using the SLAM camera 183 and process the obtained information to thereby create a map corresponding to a task execution space and at the same time estimate its own absolute location.

The LiDAR 182 is a laser radar and may also be a sensor that irradiates a laser beam and collects and analyzes backscattered light among light absorbed or scattered by aerosol to perform location recognition.

The stereo board 181 may process sensing data collected by the LiDAR 182 and the SLAM camera 183, etc. and may be responsible for data management for the location recognition and the obstacle recognition of the intelligent robot device 100.

A LAN (or communication unit 190) may communicate with the UI processor 161 that is related to the input and output of the airport user, the recognition data processing module 173, the stereo board 181, and the AP or controller 150.

Figure 9:
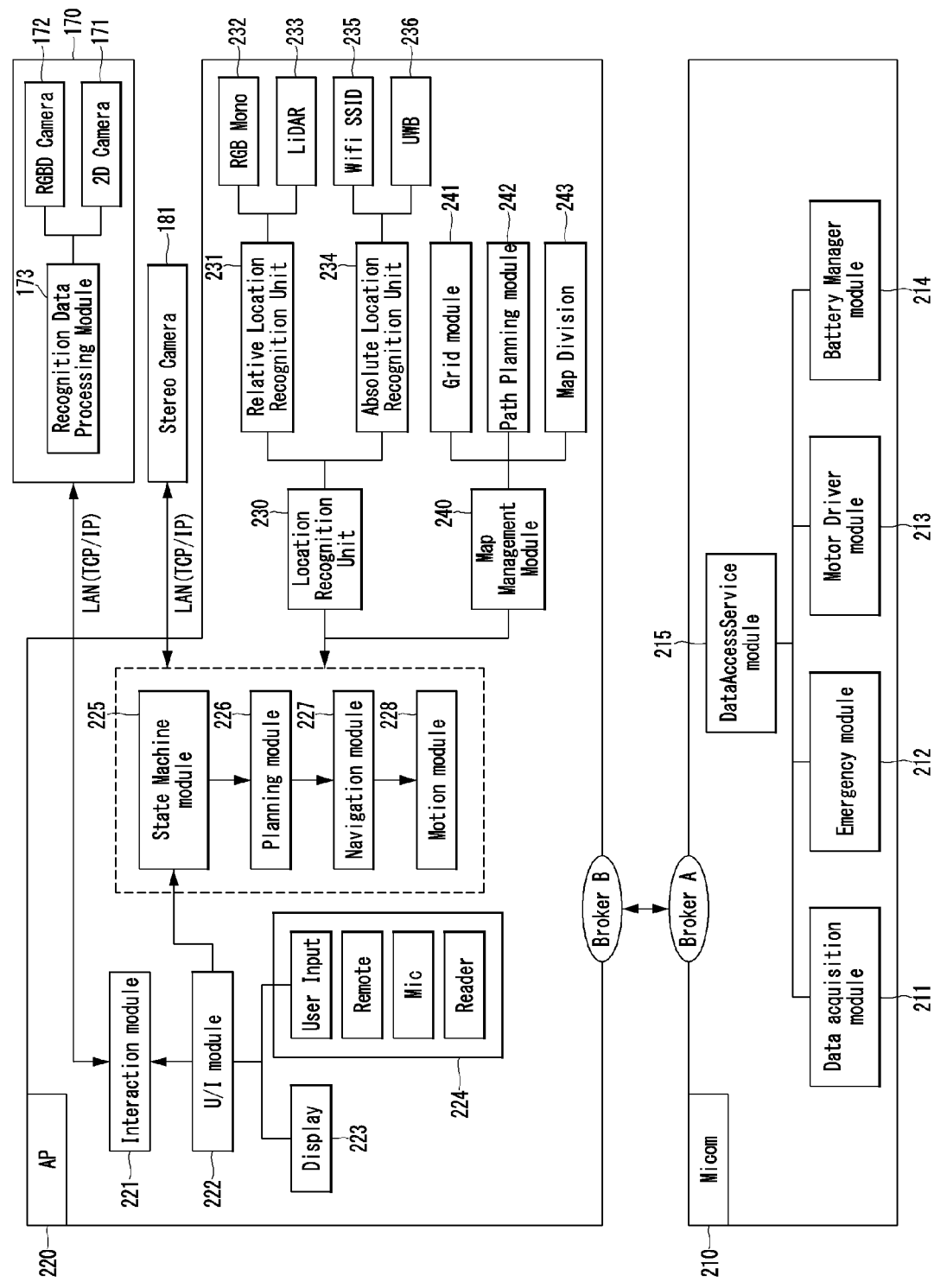
FIG. 9 illustrates in detail configuration of Micom and AP of an intelligent robot device according to another embodiment of the present disclosure.

FIG. 9 illustrates in detail configuration of Micom and AP of an intelligent robot device according to another embodiment of the present disclosure.

As illustrated in FIG. 9, a controller 150 (see FIG. 7) may be implemented in various examples in order to control recognition and behavior of an intelligent robot device 100. The controller 150 (see FIG. 7) may include a Micom 210 and an AP 220. FIG. 9 illustrates that the Micom 210 and the AP 220 are separated from each other. However, the present disclosure is not limited thereto. For example, they may be formed as one body.

For example, the Micom 210 may include a data access service module 215.

The data access service module 215 may include a data acquisition module 211, an emergency module 212, a motor driver module 213, and a battery manager module 214.

The data acquisition module 211 may acquire data sensed by a plurality of sensors included in the intelligent robot device 100 and transmit the acquired data to the data access service module 215.

The emergency module 212 is a module capable of sensing an abnormal state of the intelligent robot device 100. If the intelligent robot device 100 performs a predetermined type of behavior, the emergency module 212 may sense that the intelligent robot device 100 has entered an abnormal state.

The motor driver module 213 may manage a drive control of a wheel, a brush, and a suction motor for the travelling and the cleaning of the intelligent robot device 100.

The battery manager module 214 may be responsible for the charging and discharging of the Li-ion battery 122 shown in FIG. 8 and may transfer a battery status of the intelligent robot device 100 to the data access service module 215.

The AP 220 may serve as a controller 150 (see FIG. 7) that receives inputs of various cameras, various sensors, and the airport user and recognizes and processes the inputs to thereby control an operation of the intelligent robot device 100.

An interaction module 221 may be a module that combines recognition data received from the recognition data processing module 173 and an input of the airport user received from a user interface module 222 and oversees software which allows the airport user and the intelligent robot device 100 to interact with each other.

The user interface module 222 may manage the input of the airport user received from a user input unit 224 that receives a near command of the airport user using a display 223, a key, a touch screen, a reader, etc. which is a monitor for a current situation and operation/provision of information of the intelligent robot device 100, or receives a remote signal such as a signal of an IR remote control for remotely controlling the intelligent robot device 100, or receives an input signal of the airport user from a microphone or a barcode reader, etc.

If at least one input of the airport user is received, the user interface module 222 may transmit input information of the airport user to a state machine module 225. The state machine module 225 receiving the input information of the airport user may manage the overall state of the intelligent robot device 100 and give appropriate commands corresponding to the input of the airport user.

A planning module 226 may determine start and end time points/behavior for a specific operation of the intelligent robot device 100 according to a command received from the state machine module 225 and may calculate which path the intelligent robot device 100 should take.

A navigation module 227 is responsible for the overall travel of the intelligent robot device 100 and may cause the intelligent robot device 100 to travel according to a travel path calculated by the planning module 226. A motion module 228 may cause the intelligent robot device 100 to perform other operations in addition to the travelling.

The intelligent robot device 100 according to another embodiment of the present disclosure may include a location recognition unit 230. The location recognition unit 230 may include a relative location recognition unit 231 and an absolute location recognition unit 234.

The relative location recognition unit 231 may correct an amount of movement of the intelligent robot device 100 through an RGM mono sensor 232, calculate an amount of movement of the intelligent robot device 100 for a predetermined time, and recognize a current surrounding environment of the intelligent robot device 100 through a LiDAR 233.

The absolute location recognition unit 234 may include a Wifi SSID 235 and a ultrawide band (UWB) 236. The WiFi SSID 235 is an UWB sensor module for absolute location recognition of the intelligent robot device 100 and is also a WiFi module for estimating a current location through WiFi SSID detection. The WiFi SSID 235 may analyze a signal strength of WiFi and recognize a location of the intelligent robot device 100. The UWB 236 may calculate a distance between a transmitter and a receiver and sense an absolute location of the intelligent robot device 100.

The intelligent robot device 100 according to another embodiment of the present disclosure may include a map management module 240.

The map management module 240 may include a grid module 241, a path planning module 242, and a map division module 243.

The grid module 241 may manage map data of a surrounding environment for the location recognition previously input to the intelligent robot device 100 on a grid-shaped map or dictionary that the intelligent robot device 100 creates through the SLAM camera.

The path planning module 242 may be responsible to calculate a travel path of the intelligent robot device 100 in the map division for collaboration between the plurality of intelligent robot devices 100.

The path planning module 242 may also calculate a travel path through which the intelligent robot device 100 should move in an environment where one intelligent robot device 100 is operating.

The map division module 243 may calculate in real time a zone for which each of the plurality of intelligent robot devices 100 should be responsible.

Data that is sensed and calculated by the location recognition unit 230 and the map management module 240 may be transmitted again to the state machine module 225. The state machine module 225 may command the planning module 226 to control the operation of the intelligent robot device 100 based on the data that is sensed and calculated by the location recognition unit 230 and the map management module 240.

Hereinafter, various examples of a navigation service that the above-described intelligent robot device 100 disposed in the airport provides to the airport users will be described.

Figure 10:
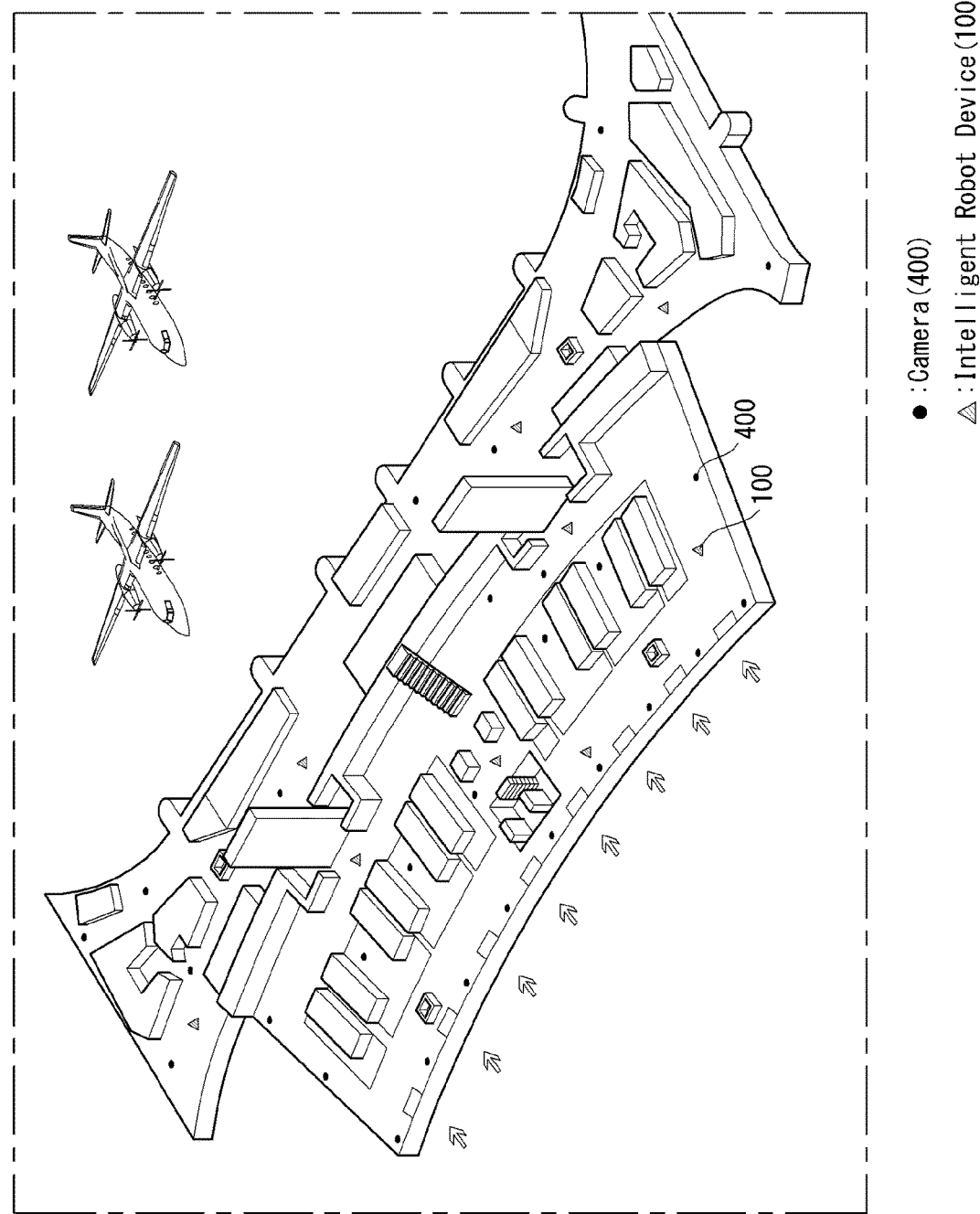
FIG. 10 illustrates a plurality of intelligent robot devices and a plurality of cameras arranged in the airport in accordance with an embodiment of the present disclosure.
Figure 11:
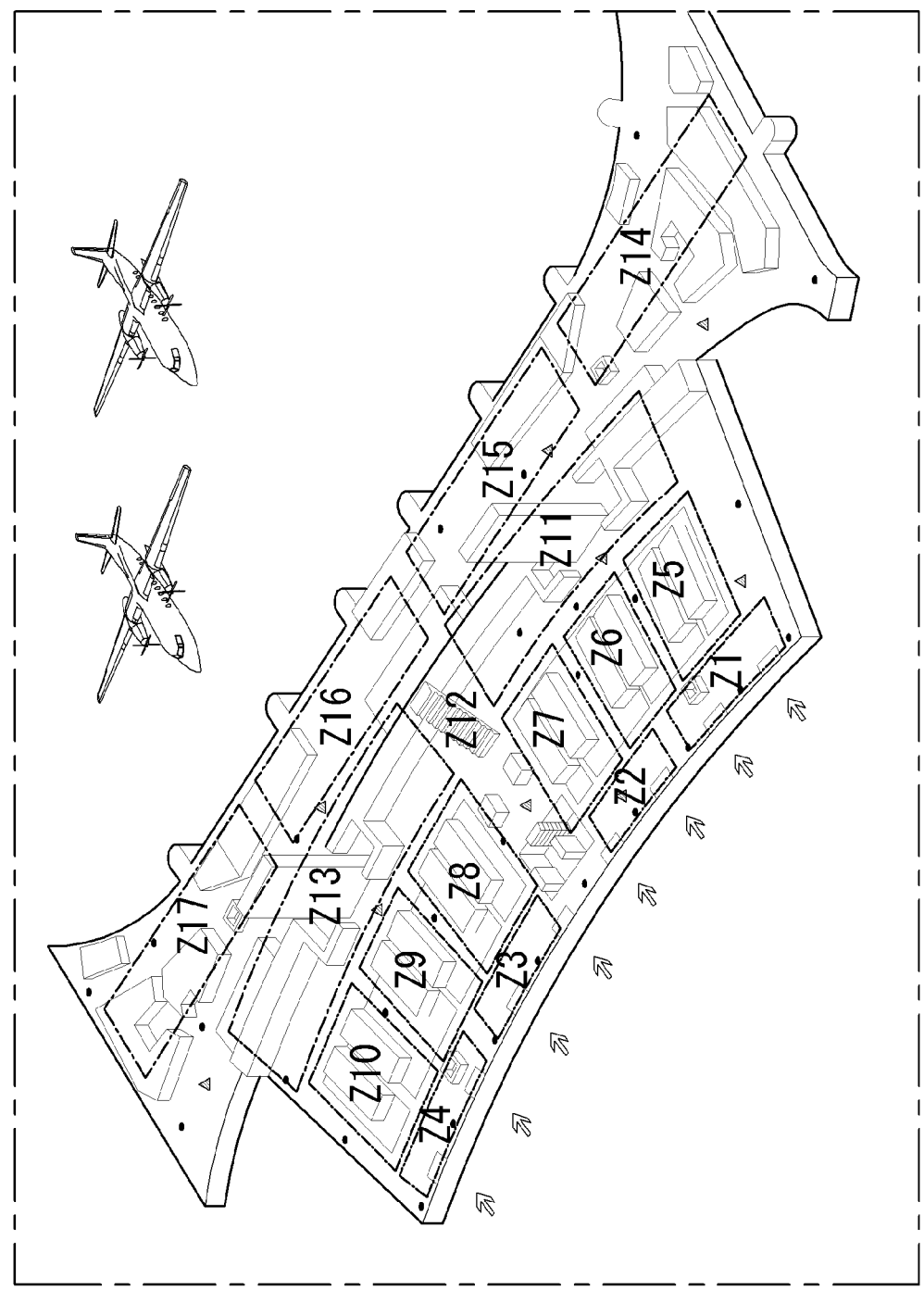
FIG. 11 illustrates that the airport is divided into a plurality of zones in accordance with an embodiment of the present disclosure.

FIG. 10 illustrates a plurality of intelligent robot devices and a plurality of cameras disposed in the airport in accordance with an embodiment of the present disclosure. FIG. 11 illustrates that the airport is divided into a plurality of zones in accordance with an embodiment of the present disclosure.

Referring to FIGS. 10 and 11, a plurality of intelligent robot devices 100 may be disposed in the airport. Each of the plurality of intelligent robot devices 100 can provide various services including guide, patrol, cleaning, or disinfect, or the like in the airport and can provide a navigation service or various information to customers or airport users. According to an embodiment of the present disclosure, the plurality of intelligent robot devices 100 is dividedly disposed in the zones of the airport and thus can provide more efficiently airport services.

Each intelligent robot device 100 can provide a navigation service while moving to the zone of the airport. For example, a first intelligent robot device 100 allocated in a Z1 zone can provide the navigation service while moving only in the Z1 zone.

A plurality of cameras 400 may also be disposed in the airport. Each of the plurality of cameras 400 may capture the plurality of intelligent robot devices 100, customer, or airport users in the airport and provide various mobility or location services such as their current locations and moving paths.

According to an embodiment of the present disclosure, the plurality of cameras 400 is dividedly disposed in the zones of the airport and thus can provide more efficiently airport services.

Referring to FIG. 11, a server 300 (see FIG. 5) according to an embodiment of the present disclosure may divide the inside of the airport into a plurality of zones. The server 300 (see FIG. 5) may set the plurality of zones Z1 to Z17 and dispose at least one intelligent robot device 100 in each of the divided zones Z1 to Z17.

The server 300 may change the zones at predetermined time intervals based on various information (e.g., flight schedules, airport user density per zone, etc.) of the airport. The server 300 may control the plurality of cameras 400 disposed in the airport and differently set a range of the captured zone or area. For example, a first camera that normally captures the Z1 zone may capture a zone smaller than the Z1 zone under the control of the server 300. Alternatively, a second camera that captures the Z2 zone adjacent to the Z1 zone may capture a zone wider than the Z2 zone under the control of the server 300.

The server 300 may adjustably rearrange at least one intelligent robot device 100 in each of the zones changed every predetermined time.

Each intelligent robot device 100 can provide the navigation service while moving in the divided zone. For example, the first intelligent robot device 100 allocated in the Z1 zone may patrol only in the Z1 zone and provide the navigation service. That is, if a destination requested by the airport user exists in the Z1 zone, the first intelligent robot device 100 may escort the airport user to the destination On the other hand, if a destination requested by the airport user does not exist in the Z1 zone, the first intelligent robot device may escort the airport user up to a path included in the Z1 zone on a path to the destination. Afterwards, the first intelligent robot device may call one of other intelligent robot devices, that patrol other zones adjacent to the Z1 zone, and provide the called intelligent robot device with information about the destination requested by the airport user and a remaining path of the destination, so that the called intelligent robot device can escort the airport user to the destination.

Figure 12:
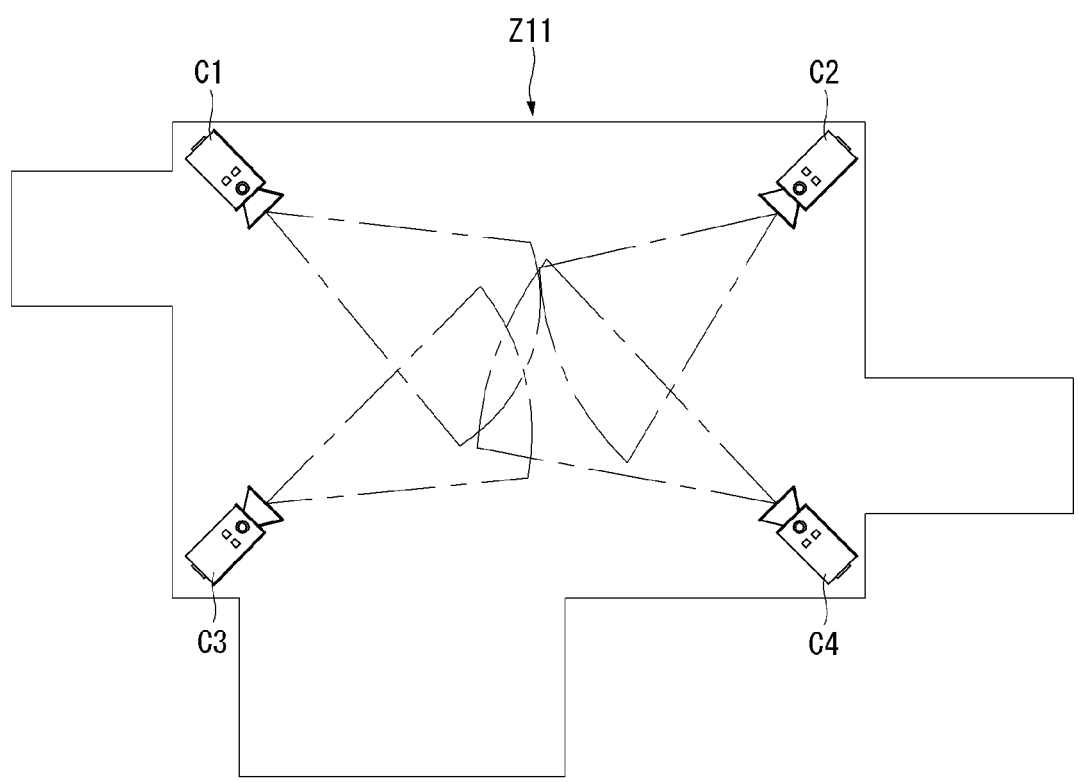
FIG. 12 illustrates that a plurality of cameras is disposed in a predetermined zone in accordance with an embodiment of the present disclosure.

FIG. 12 illustrates that a plurality of cameras is disposed in various positions in accordance with an embodiment of the present disclosure.

Referring to FIG. 12, a plurality of cameras may be disposed in various positions in a Z11 zone in accordance with an embodiment of the present disclosure. The plurality of cameras may include first to fourth cameras C1 to C4.

The first camera C1 may be disposed at a first corner of the Z11 zone. For example, the first corner may be disposed on the left rear side of the Z11 zone. The second camera C2 may be disposed at a second corner of the Z11 zone. For example, the second corner may be disposed on the right rear side of the Z11 zone. The third camera C3 may be disposed at a third corner of the Z11 zone. For example, the third corner may be disposed on the left front side of the Z11 zone. The fourth camera C4 may be disposed at a fourth corner of the Z11 zone. For example, the fourth corner may be disposed on the right front side of the Z11 zone.

Each of the first to fourth cameras C1 to C4 can thoroughly capture the entire Z11 zone without omission while rotating in the direction of 360 degrees. Further, if the first to fourth cameras C1 to C4 capture one of the intelligent robot device 100 (see FIG. 5), the customer, or the airport user as a target, a portion of the Z11 zone may be captured overlappingly.

Figure 13:
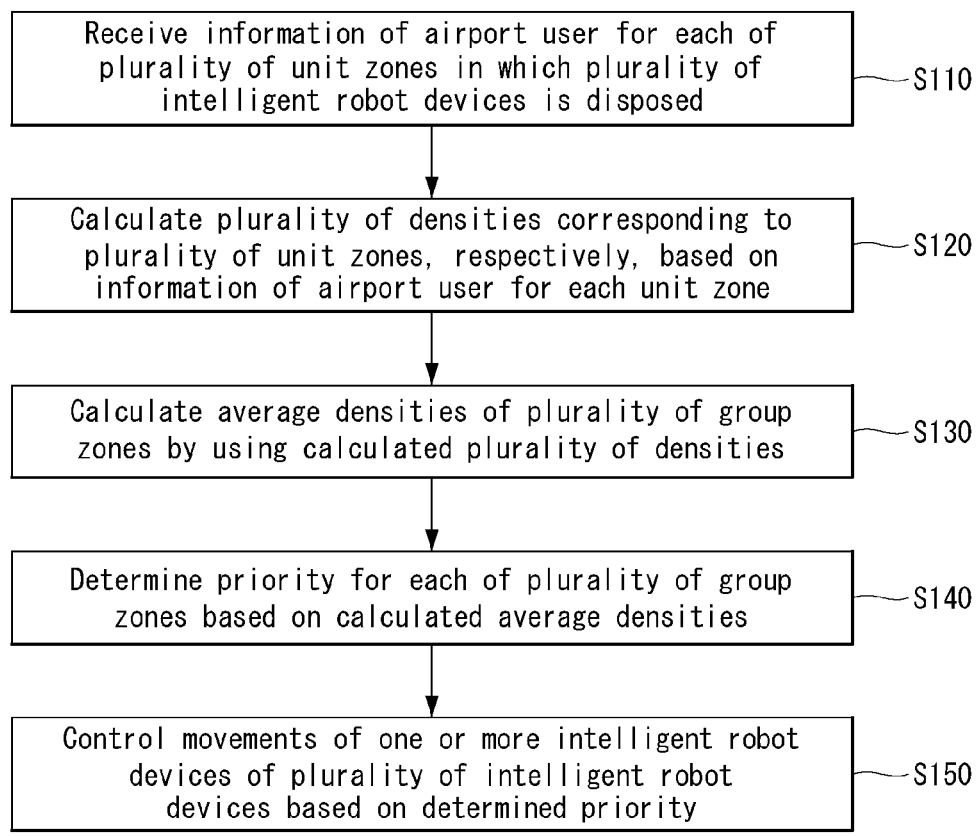
FIGS. 13 to 15 are flowcharts describing an operation method of an AI server that provides a guidance service according to an embodiment of the present disclosure.
Figure 14:
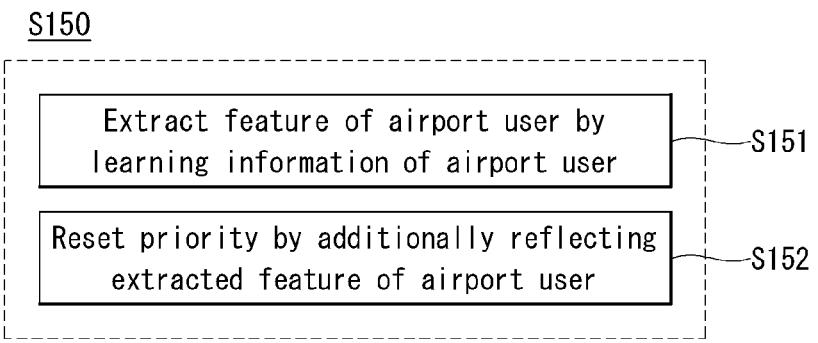
Figure 15:
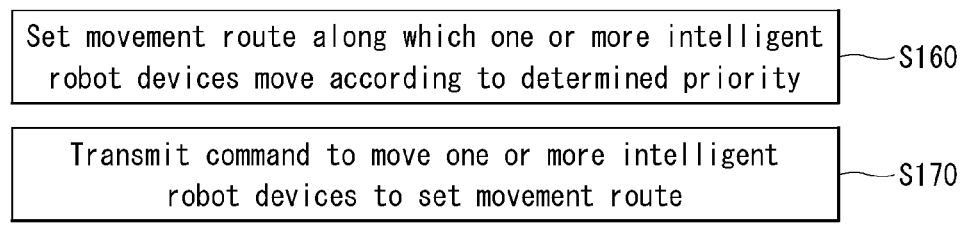

FIGS. 13 to 15 are flowcharts describing an operation method of an AI server that provides a guidance service according to an embodiment of the present disclosure.

Referring to FIG. 13, a step of receiving information of an airport user for each of a plurality of unit zones in which a plurality of intelligent robot devices is disposed may be included (S110).

A step of calculating a plurality of densities corresponding to the plurality of unit zones, respectively, based on the information of the airport user for each unit zone may be included (S120). Each of a plurality of group zones may include some of the plurality of unit zones.

A step of calculating average densities of the plurality of group zones by using the calculated plurality of densities may be included (S130).

A step of determining a priority for each of the plurality of group zones based on the calculated average densities may be included (S140).

A step of controlling movements of one or more intelligent robot devices of the plurality of intelligent robot devices based on the determined priority may be included (S150).

The step of controlling the movements of the intelligent robot devices may include transmitting a command to move the one or more intelligent robot devices to a group zone to which a high priority is assigned, of the plurality of group zones.

Referring to FIG. 14, the step of controlling the movements of the intelligent robots (S150) may include a step of extracting a feature of the airport user by learning the information of the airport user (S151) and a step of resetting the priority by additionally reflecting the extracted feature of the airport user (S152).

In the step of extracting a feature of the airport user (S151), the extraction may be performed by using at least one of sex, age, the number of uses of the airport, a uniform-wearing status, and a service history of the intelligent robot device for the airport user.

Alternatively, in the step of extracting a feature of the airport user (S151), a different weight may be assigned to each of sex, age, the number of uses of the airport, a uniform-wearing status, and a service history of the intelligent robot device for the airport user.

The step of resetting the priority (S152) may further include a step of assigning a higher priority to the group zone with a higher weight for the feature of the airport users. The step of resetting the priority (S152) may further include a step of assigning a higher priority to the group zone with the greater average density of the calculated average densities.

Referring to FIG. 15, a step of setting a movement route along which the one or more intelligent robot devices move according to the determined priority (S160), and a step of transmitting a command to move the one or more intelligent robot devices to the set movement route (S170) may be further included.

The step of transmitting a command (S170) may include transmitting a command to move the one or more intelligent robot devices from a group zone with a high priority to a group zone with a low priority.

Figure 16:
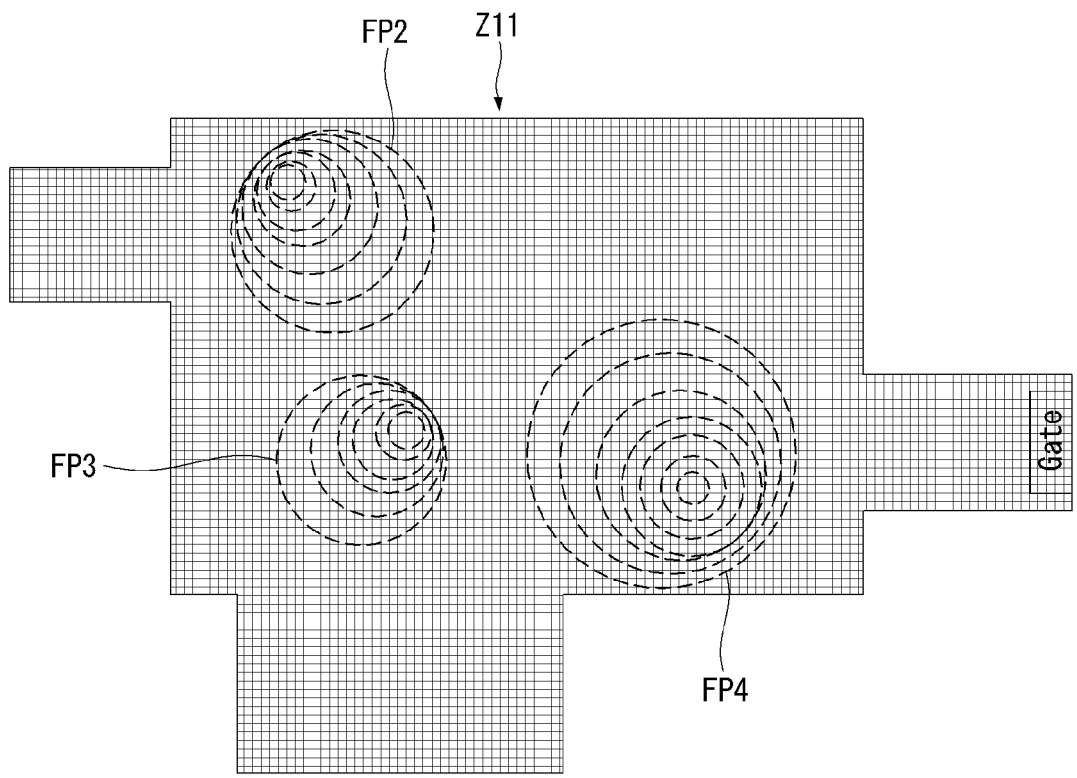

FIGS. 16 and 17 illustrate densities of airport users in accordance with an embodiment of the present disclosure.

Referring to FIGS. 16 and 17, the server may calculate densities of the airport users of the zone Z11 by using a first intelligent robot device 100*a* to a fifth intelligent robot device 100*e* (not pictured in FIGS. 16 and 17) and reflect the calculated densities of the airport users to the service area, in accordance with the embodiment of the present disclosure.

The server may dispose each of the first intelligent robot device 100*a* to the fifth intelligent robot device 100*e* in the zone Z11 which is set as the different initial service area differently for the devices 100*a* to 100*e*.

The first intelligent robot device 100*a* to the fifth intelligent robot device 100*e* may collect densities of airport users while patrolling or driving the service area which is set as the initial service area differently for one another. The first intelligent robot device 100*a* to the fifth intelligent robot device 100*e* may share the densities of airport users collected by patrolling the zone Z11 with one another and calculate a first density FP1 to a fourth density FP4 for the zone Z11. The server may be provided with the first density FP1 to the fourth density FP4 calculated through the first intelligent robot device 100*a* to the fifth intelligent robot device 100*e*.

As illustrated in FIG. 17, the server may represent the densities of airport users by displaying the calculated first density FP1 to fourth density FP4 with one or more circles in the zone Z11. For example, since the fourth density FP4 is higher than the second and third densities FP2 and FP3 in the zone Z11, the server may display the fourth density FP4 with more circles than the others. When the first density FP1 is zero in the zone Z11, the server may not display the first density FP1 in the zone Z11.

FIG. 18 illustrates a density measured in each unit zone in accordance with an embodiment of the present disclosure.

Referring to FIG. 18, an entire zone 600 having a square shape is shown.

The entire zone 600 may include a plurality of unit zones. Each of unit zones 601 may also have a square shape. In FIG. 18, the entire zone 600 may be represented by a 5×5 zone. The entire zone 600 may include 25 unit zones.

A density measured based on the information of the airport user may be described in each of the unit zones 601. For example, in the first row of the entire zone 600, the densities measured in respective unit zones, such as <1, 3, 0, 2, 5> may be described.

The memory 25 may store location information indicating the location of each of the unit zones 601. The processor 110 may obtain coordinates of each unit zone by using a positioning module such as a GPS module.

The location information of each of the unit zones 601 may be a center coordinate of the unit zone.

The processor 110 measures average densities of the plurality of group zones by using the calculated plurality of densities (S130) (see FIG. 13).

The processor 110 may divide the entire zone 600 into a plurality of group zones, and measure average densities based on the densities of unit zones included in the divided group zones.

Each group zone may have a 4×4 square, 3×3 square, or a 2×2 square.

The processor 110 determines a priority for each of the plurality of group zones based on the average densities (S140).

The processor 110 may assign a higher priority to the corresponding group zone with a greater average density. The priority may be a ranking determined to preferentially move the intelligent robot devices to the corresponding group zone.

Figure 19:
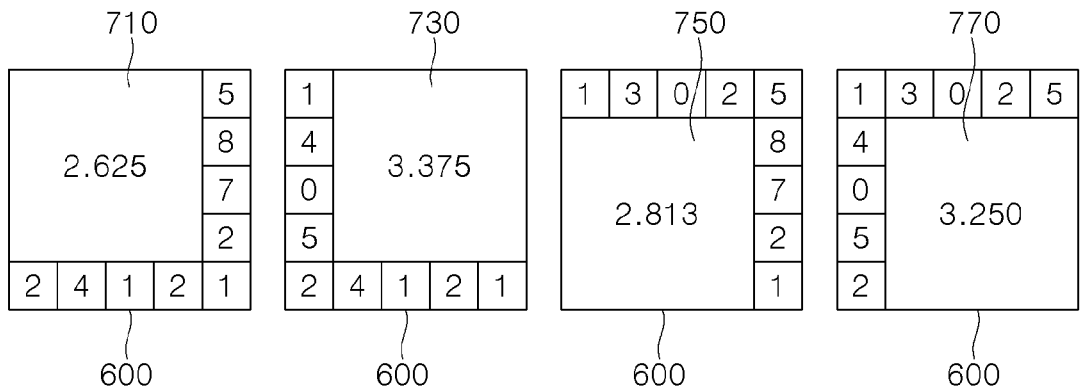
FIGS. 19 to 21 illustrate a process of measuring an average density of each unit group zone by dividing an entire zone into a plurality of unit group zones.
Figure 20:
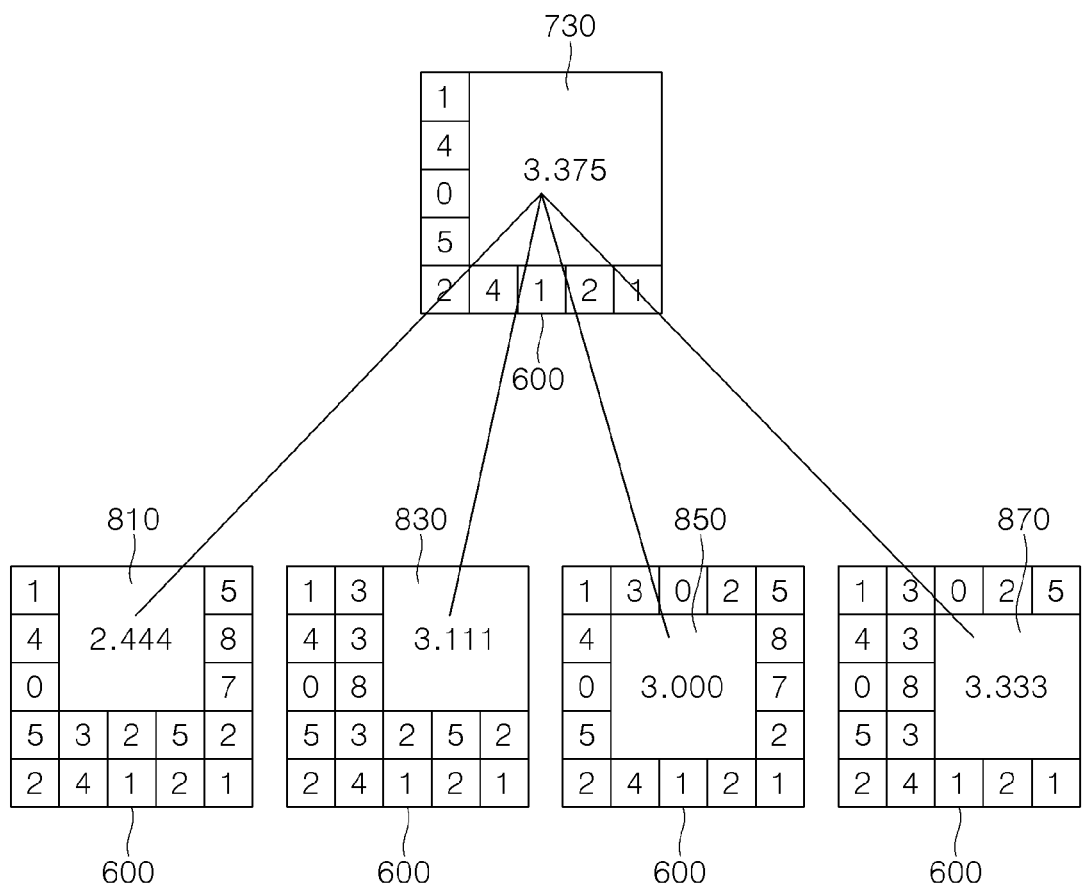
Figure 21:
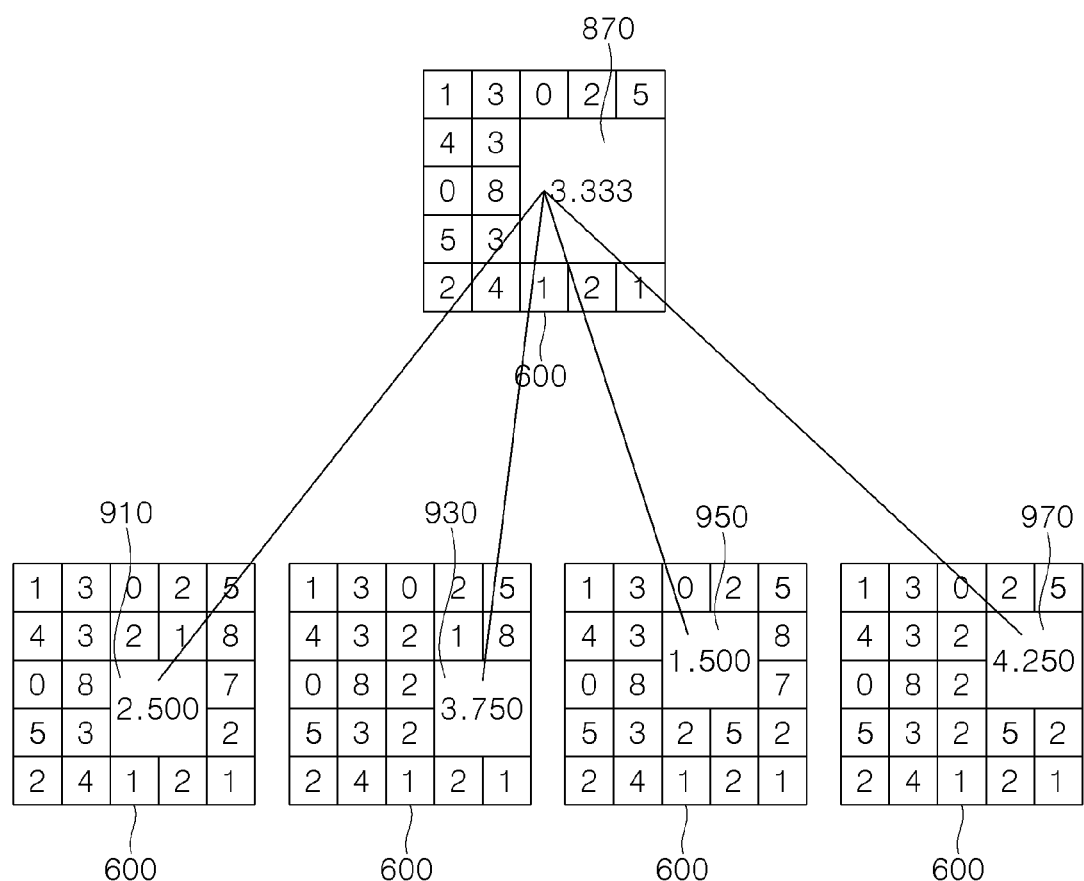

FIGS. 19 to 21 illustrate a process of dividing an entire zone into a plurality of unit group zones and measuring an average density of each unit group zone.

FIG. 19 illustrates a result of dividing the entire zone 600 having a form of 5×5 into unit group zones having a form of 4×4 and measuring an average density of each unit group zone.

The entire zone 600 may be divided into four unit group zones 710 to 770.

The memory 25 may store location information indicating the location of each unit group zone. The location information of each unit group zone may be a center coordinate of each unit group zone.

Each unit group zone may have the form of 4×4, that is, include 16 unit zones.

An average density of the first unit group zone 710 may be an average value of the densities measured in the plurality of unit zones included in the first unit group zone 710.

That is, the average density of the first unit group zone 710 may be calculated as (1+3+0+2+4+3+2+1+0+8+2+1+5+3+2+5)/16=2.625.

An average density of the second unit group zone 730 may be an average value of the densities measured in the plurality of unit zones included in the second unit group zone 730.

In the same way, the average density of the second unit group zone 730 may be calculated as 3.375.

An average density of the third unit group zone 750 may be an average value of the densities measured in the plurality of unit zones included in the third unit group zone 750.

The average density of the third unit group zone 750 may be calculated as 2.813.

An average density of the fourth unit group zone 770 may be an average value of the densities measured in the plurality of unit zones included in the fourth unit group zone 770.

The average density of the fourth unit group zone 770 may be calculated as 3.250.

The processor 110 may determine a priority for preferentially moving the intelligent robot devices based on the average densities of the first to fourth unit group zones 710 to 770. The processor 110 may assign a higher priority to the unit group zone with a greater average density. That is, the second unit group zone 730 may be the first rank, the fourth unit group zone 770 may be the second rank, the third unit group zone 750 may be the third rank, and the first unit group zone 710 may be the fourth rank.

The processor 110 may assign the highest priority to the second unit group zone 730 having the greatest average density among the first to fourth unit group zones 710 to 770. The processor 110 may transmit, to the one or more intelligent robot devices, a command to move one or more robots to the second unit group zone 730 with the highest priority.

To this end, the processor 110 may transmit the location information of each unit group zone to one or more robots simultaneously.

The location information of each unit group zone may be previously stored in the memory 25.

As another example, the processor 110 may further subdivide the second unit group zone 730 to measure the average density.

Referring to FIG. 20, the second unit group zone 730 may be divided into a plurality of sub unit group zones 810 to 870.

Each of the plurality of sub unit group zones 810 to 870 may have a form of 3×3. Each sub unit group zone may include nine unit zones.

The memory 25 may store location information of each sub unit group zone. The location information of each sub unit group zone may be a center coordinate of each sub unit group zone.

The processor 110 may measure an average density of each of the plurality of sub unit group zones 810 to 870 constituting the second unit group zone 730 in order to check for a sub unit group zone with a higher average density than the second unit group zone 730.

An average density of the first sub unit group zone 810 may be an average value of the densities measured in the plurality of unit zones included in the first sub unit group zone 810. The average density of the first sub unit group zone 810 may be calculated as (3+0+2+3+2+1+8+2+1)/9=2.444.

An average density of the second sub unit group zone 830 may be an average value of the densities measured in the plurality of unit zones included in the second sub unit group zone 830. In the same way, the average density of the second sub unit group zone 830 may be calculated as 3.111.

An average density of the third sub unit group zone 850 may be an average value of the densities measured in the plurality of unit zones included in the third sub unit group zone 850. The average density of the third sub unit group zone 850 may be calculated as 3.0.

An average density of the fourth sub unit group zone 870 may be an average value of the densities measured in the fourth sub unit group zone 870. The average density of the fourth sub unit group zone 870 may be calculated as 3.333.

The processor 110 may determine priority for preferentially moving the intelligent robot devices based on the average densities of the first to fourth sub unit group zones 810 to 870.

The processor 110 may assign a higher priority to the sub unit group zone with a greater average density.

That is, the fourth sub unit group zone 870 may be the first rank, the second sub unit group zone 830 may be the second rank, the third sub unit group zone 850 may be the third rank, and the first sub unit group zone 810 may be the fourth rank.

The processor 110 may assign the highest priority to the fourth sub unit group zone 870 having the greatest average density.

The processor 110 may transmit, to the one or more robots, a command to move one or more robots to the fourth sub unit group zone 870. The command may also include location information of the fourth sub unit group zone 870.

The processor 110 may further subdivide the fourth sub unit group zone 870 to measure the average density.

Referring to FIG. 21, the fourth sub unit group zone 870 may be divided into a plurality of smallest sub unit group zones 910 to 970. Each of the plurality of smallest sub unit group zones 910 to 970 may have a form of 2×2. Each of the smallest sub unit group zones may include four unit zones.

The memory 25 may store location information of each of the smallest sub unit group zones. The location information of each of the smallest sub unit group zones may be a center coordinate of each of the smallest sub unit group zones.

The processor 110 may measure an average density of each of the plurality of smallest sub unit group zones 910 to 970 in order to check a denser zone even within the fourth sub unit group zone 870.

An average density of the first smallest sub unit group zone 910 may be an average value of the densities of the plurality of unit zones included in the first smallest sub unit group zone 910. The average density of the first smallest sub unit group zone 910 may be calculated as (2+1+2+5)/4=2.5.

An average density of the second smallest sub unit group zone 930 may be an average value of the densities of the plurality of unit zones included in the second smallest sub unit group zone 930. The average density of the second smallest sub unit group zone 930 may be calculated as 3.75.

An average density of the third smallest sub unit group zone 950 may be an average value of the densities of the plurality of unit zones included in the third smallest sub unit group zone 950.

The average density of the third smallest sub unit group zone 950 may be calculated as 1.5.

An average density of the fourth smallest sub unit group zone 970 may be an average value of the densities of the plurality of unit zones included in the fourth smallest sub unit group zone 970. The average density of the fourth smallest sub unit group zone 970 may be calculated as 4.25.

The processor 110 may assign a higher priority to the corresponding smallest sub unit group zone with a greater average density. That is, the fourth smallest sub unit group zone 970 may be the first rank, the second smallest sub unit group zone 930 may be the second rank, the first smallest sub unit group zone 910 may be the third rank, and the third smallest sub unit group zone 950 may be the fourth rank.

The processor 110 may determine the fourth smallest sub unit group zone 970 having the greatest average density as a zone where guidance for airport users is urgently needed.

As described above, according to the embodiment of the present disclosure, since the entire zone 600 is subdivided into zones where the airport users are dense, it is possible to immediately react to a situation that requires guidance.

Accordingly, the intelligent robot devices may move to the zone where the airport users are dense, and directly provide the guidance service desired by the airport users.

The processor 110 may transmit a command to move one or more intelligent robot devices to the group zone corresponding to the highest priority, to one or more intelligent robot devices through the communication unit 190.

The processor 110 may transmit a command to move the one or more intelligent robot devices to a zone with the highest priority among the plurality of unit group zones, to one or more intelligent robot devices.

The processor 110 may transmit a command to move one or more intelligent robot devices to a zone with the highest priority among a plurality of sub unit group zones, to the one or more intelligent robot devices.

The processor 110 may transmit a command to move one or more intelligent robot devices to a zone with the highest priority among a plurality of smallest sub unit group zones, to the one or more intelligent robot devices. The one or more intelligent robot devices may be idle intelligent robot devices that have completed their work.

Meanwhile, the processor 110 may set a route along which the one or more intelligent robot devices move according to the priority.

The processor 110 may transmit, to the one or more intelligent robot devices, a command to move the one or more intelligent robot devices in order of the second unit group zone 730, the fourth unit group zone 770, the third unit group zone 750, and the first unit group zone 710.

Figures 22, 23:
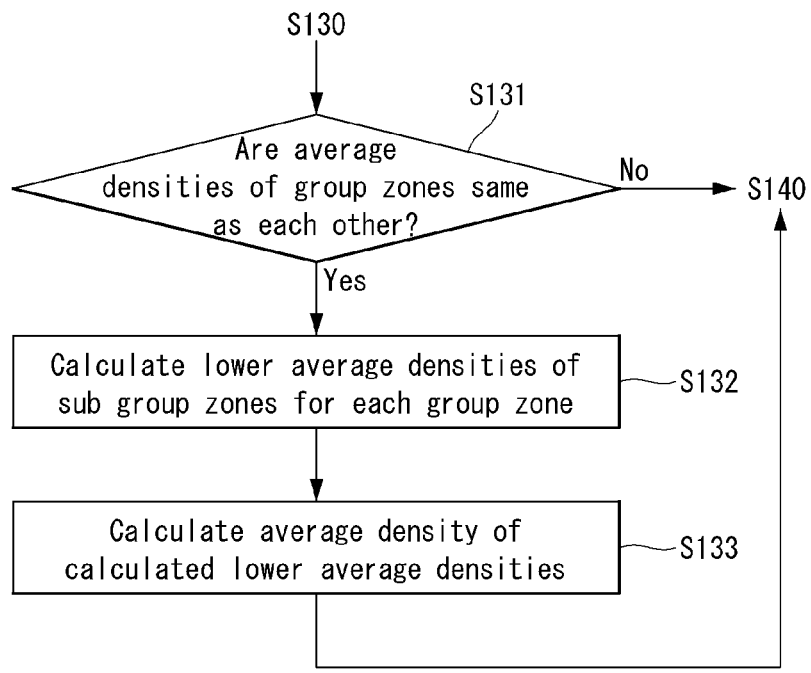
FIG. 22 is a flowchart illustrating a method of determining the priority of each group zone when the average density of the group zones is the same in accordance with the embodiment of the present disclosure.
FIG. 23 illustrates a practical example of determining the priority when the average density of the group zones is the same in accordance with an embodiment of the present disclosure.

FIG. 22 is a flowchart illustrating a method for determining the priority of each group zone when the average densities of the group zones are the same as each other in accordance with the embodiment of the present disclosure.

Referring to FIG. 22, after performing step S130 of FIG. 13, the processor 110 may determine whether the average densities of group zones are the same as each other (S131).

When the average densities of the group zones are same as each other, the processor 110 may calculate lower average densities of the sub group zones for each group zone (S132).

The processor 110 calculates an average density of the lower average densities calculated for each group zone (S133).

Next, the processor 110 determines priority for the group zones based on the calculated average density (S140).

The embodiment of FIG. 22 will be described with reference to FIG. 23.

FIG. 23 illustrates a practical example of determining the priority when the average densities of the group zones are the same as each other in accordance with an embodiment of the present disclosure.

Referring to FIG. 23, the first group zone 1110 and the second group zone 1130 in the form of 3×3 included in the entire zone 600 are shown.

The average density of each of the first group zone 1110 and the second group zone 1130 is equal to 3.0.

In order to determine priorities between the first group zone 1110 and the second group zone 1130, the processor 110 may calculate lower average densities corresponding to the sub group zones constituting the first group zone 1110, respectively, and lower average densities corresponding to the sub group zones constituting the second group zone 1130, respectively.

Each of the lower average densities may be an average density for the zone having the form of 2×2.

The processor 110 may compare an average (2.2875) of lower average densities of sub group zones constituting the first group zone 1110 with an average (3.438) of lower average densities of sub group zones constituting the second group zone 1130.

The processor 110 may assign a higher priority to the second group zone 1130, rather than the first group zone 1110, since the average (3.438) of the lower average densities of the sub group zones constituting the second group zone 1130 is greater than the average (2.2875) of the lower average densities of the sub group zones constituting the first group zone 1110.

As described above, according to the embodiment of the present disclosure, when the average densities of the group zones are same as each other, the priorities for the group zones may be determined based on the average density of the sub group zones of each group zone.

Accordingly, the movement position of the intelligent robot device providing the guidance service may be more clearly determined.

The present disclosure described above may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

Effects of the control system to control the intelligent robot device according to the present disclosure are as follows.

The present disclosure may provide the best service to airport users by controlling the movement route of the intelligent robot device, where the controlling of the movement route is performed by disposing a plurality of intelligent robot devices in a plurality of zones within an airport, respectively, setting priority by extracting a density of airport users moving the plurality of zones and features of the airport users, and providing airport service according to the set priority.

Furthermore, the present disclosure may improve the convenience of airport users by intelligent robot devices disposed in a plurality of zones in the airport, respectively, and performing airport services in the corresponding zones in accordance with priorities.

The present disclosure can improve reliability of an intelligent robot system by controlling an intelligent robot device through AI processing.

Effects obtainable from the present disclosure are not limited by the effects mentioned above, and other effects which are not mentioned above can be clearly understood from the following description by those skilled in the art to which the present disclosure pertains.

What is claimed is:

1. A control system comprising:
   a transceiver that is configured to receive information of a user within each unit zone, wherein a plurality of robots is disposed in a zone, wherein the zone is divided into a plurality of group zones, and wherein each group zone is divided into a plurality of unit zones; and
   a processor that is configured to:
   determine densities for the plurality of unit zones based on the received information of the user,
   determine average densities for the plurality of group zones based on the determined densities for the plurality of unit zones included each group zone,
   extract at least one feature from the received information of the user within each unit zone based on machine learning and assign a weight to the at least one extracted feature of the user within each unit zone,
   determine a priority for each group zone from among the plurality of group zones based on the determined average densities and the assigned weight of the at least one extracted feature of the user within each unit zone, and
   transmit a command to move one or more robots from among the plurality of robots to a group zone associated with a highest priority compared with priorities associated with other group zones from among the plurality of group zones,
   wherein the plurality of group zones includes a first group zone and a second group zone, and the priority is determined by comparing the assigned weight of the at least one extracted feature of a user within the first group zone with the assigned weight for the at least one extracted feature of a user within the second group zone when a first average density of the first group zone has a same value as a second average density of the second group zone.

2. The control system of claim 1, wherein the at least one extracted feature of the user within each unit zone includes at least one of a sex of the user, an age of the user, a number of times the user visited the zone, a uniform-wearing status of the user, or a service history of a robot for the user.

3. The control system of claim 1, wherein the processor is further configured to assign a higher priority to the group zone with a greater average density from the determined average densities.

4. The control system of claim 3,
   wherein the priority is determined by comparing a first average of average densities of sub group zones constituting the first group zone with a second average of average densities of sub group zones constituting the second group zone when a first average density of the first group zone has a same value as a second average density of the second group zone.

5. The control system of claim 1,
   wherein the processor is further configured to:
   set a movement route along which the one or more robots move according to the determined priority; and
   transmit a command to move the one or more robots according to the set movement route.

6. The control system of claim 5, wherein the processor is further configured to transmit a command to move the one or more robots from a third group zone associated with a high priority to a fourth group zone associated with a low priority.

7. The control system of claim 1,
   wherein the information of the user includes image data for each unit zone and audio data collected from each unit zone, and
   wherein the processor is further configured to determine a number of users in each unit zone as a density of each unit zone by using the image data or the audio data.

8. The control system of claim 7, further comprising:
   a memory configured to store an image recognition model for recognizing a face of the user within each unit zone by using the image data, wherein the image recognition model corresponds to an artificial neural network-based model trained and learned by using a deep running algorithm or machine learning algorithm, and
   wherein the processor is further configured to recognize faces of users by using the image data and the image recognition model and determine a number of recognized faces as the number of users.

9. The control system of claim 1, further comprising:
   a memory configured to store location information indicating a location of each of the plurality of group zones,
   wherein the processor is further configured to control movements of the one or more robots by using the priority and the location information.

10. A method, the method comprising:
    receiving information of a user within each unit zone, wherein a plurality of robots is disposed in a zone, wherein the zone is divided into a plurality of group zones, and wherein each group zone is divided into a plurality of unit zones;
    determining average densities for the plurality of unit zones based on the received information of the user;
    determining average densities for the plurality of group zones based on the determined densities for the plurality of unit zones included in each group zone;
    extracting at least one feature from the information of the user within each unit zone based on machine learning and assigning a weight to the at least one extracted feature of the user within each unit zone;
    determining a priority for each group zone from among the plurality of group zones based on the determined average density and the assigned weight of the at least one extracted feature of the user within each unit zone; and transmitting a command to move one or more robots from among the plurality of robots to a group zone associated with a highest priority compared with priorities associated with other group zones from among the plurality of group zones, wherein the plurality of group zones includes a first group zone and a second group zone, and the priority is determined by comparing the assigned weight for the at least one extracted feature of a user within the first group zone with the assigned weight for the at least on extracted feature of a user within the second group zone when a first average density of the first group zone has a same value as a second average density of the second group zone.

11. The method of claim 10, wherein the extracted at least one feature of the user within each unit zone includes at least one of a sex of the user, an age of the user, a number of times the user visited the zone, a uniform-wearing status of the user, or a service history of the robot for the user.

12. The method of claim 10, wherein the determining of the priority comprises:

assigning a higher priority to the group zone with a greater average density from the determined average densities.

13. The method of claim 12, wherein the determining of the priority further includes determining the priority by comparing a first average of average densities of sub group zones constituting the first group zone with a second average of average densities of sub group zones constituting the second group zone when a first average density of the first group zone has a same value as a second average density of the second group zone.

14. The method of claim 10, further comprising:

setting a movement route along which the one or more robots move according to the determined priority; and transmitting a command to move the one or more robots according to the set movement route.

15. The method of claim 14, wherein the transmitting the command further includes transmitting the command to move the one or more robots from a third group zone associated with a high priority to a fourth group zone associated with a low priority.

* * * * *

UNITED STATES PATENT AND TRADEMARK OFFICE
CERTIFICATE OF CORRECTION

| | |
|---|---|
| PATENT NO. | : 11,458,623 B2 |
| APPLICATION NO. | : 16/703683 |
| DATED | : October 4, 2022 |
| INVENTOR(S) | : Jichan Maeng et al. |

It is certified that error appears in the above-identified patent and that said Letters Patent is hereby corrected as shown below:

On the Title Page

Include the following:
(30) Foreign Application Priority Data
Aug. 2, 2019 (KR) 10-2019-0094580

Signed and Sealed this
Eleventh Day of July, 2023

Katherine Kelly Vidal
*Director of the United States Patent and Trademark Office*